US012804432B2

(12) United States Patent
Kawano et al.

(10) Patent No.: US 12,804,432 B2
(45) Date of Patent: Nov. 17, 2026

(54) TERMINAL APPARATUS, BASE STATION APPARATUS, AND METHOD

(71) Applicant: Sharp Kabushiki Kaisha, Sakai City (JP)

(72) Inventors: Takuma Kawano, Sakai City (JP); Shohei Yamada, Sakai City (JP); Hidekazu Tsuboi, Sakai City (JP); Kyosuke Inoue, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 312 days.

(21) Appl. No.: 18/691,923

(22) PCT Filed: Sep. 8, 2022

(86) PCT No.: PCT/JP2022/033779
§ 371 (c)(1),
(2) Date: Mar. 14, 2024

(87) PCT Pub. No.: WO2023/042752
PCT Pub. Date: Mar. 23, 2023

(65) Prior Publication Data

US 2024/0430718 A1 Dec. 26, 2024

(30) Foreign Application Priority Data

Sep. 15, 2021 (JP) ................................ 2021-149943

(51) Int. Cl.
*H04W 24/08* (2009.01)
*H04W 76/19* (2018.01)
*H04W 76/20* (2018.01)

(52) U.S. Cl.
CPC .......... *H04W 24/08* (2013.01); *H04W 76/19* (2018.02); *H04W 76/20* (2018.02)

(58) Field of Classification Search
CPC ..... H04W 24/08; H04W 76/19; H04W 76/20; H04W 16/28; H04W 16/32; H04W 52/02; H04W 72/0457; H04W 76/15
See application file for complete search history.

(56) References Cited

U.S. PATENT DOCUMENTS

| | | | | |
|---|---|---|---|---|
| 2021/0013951 | A1* | 1/2021 | Chen | H04B 7/088 |
| 2022/0167445 | A1* | 5/2022 | Wang | H04W 76/27 |
| 2023/0337020 | A1* | 10/2023 | Da Silva | H04B 7/088 |
| 2024/0214842 | A1* | 6/2024 | Min | H04W 24/02 |
| 2024/0349088 | A1* | 10/2024 | Kim | H04L 69/28 |

OTHER PUBLICATIONS

Official Communication issued in International Patent Application No. PCT/JP2022/033779, mailed on Dec. 6, 2022.

(Continued)

*Primary Examiner* — Kan Yuen
(74) *Attorney, Agent, or Firm* — Keating & Bennett, LLP

(57) ABSTRACT

A processing unit of a terminal apparatus communicates with a base station apparatus using an MCG and an SCG, determines whether to perform beam failure detection in the terminal apparatus based on whether information indicating whether to perform beam failure detection is included in an SCG deactivation command transmitted from the previous base station apparatus, and the terminal apparatus determines whether to perform beam failure detection based on a determination of whether to perform beam failure detection.

3 Claims, 12 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 16)", 3GPP TS 38.300 V16.4.0, Dec. 2020, pp. 1-149.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.4.0, Dec. 2020, pp. 1-391.
"3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.3.0, Dec. 2020, pp. 1-1084.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.4.0, Dec. 2020, pp. 1-84.
"3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.
Apple Inc, "Remaining aspects related to RACH-less SCG reactivation", 3GPP TSG RAN WG2 Meeting #115-e, R2-2107602, Aug. 9-27, 2021, 4 pages.
ZTE Corporation et al., "Discussion on UE behaviour when SCG is deactivated", 3GPP TSG-RAN WG2 Meeting #114-e, R2-2105158, May 19-27, 2021, 8 pages.

* cited by examiner

```
CellGroupConfig ::=                SEQUENCE {
        <PARTLY OMITTED>
    spCellConfig                   SpCellConfig        OPTIONAL,
        <PARTLY OMITTED>
}
SpCellConfig ::=                   SEQUENCE {
        <PARTLY OMITTED>
    reconfigurationWithSync                ReconfigurationWithSync        OPTIONAL,
        <PARTLY OMITTED>
}
ReconfigurationWithSync ::=        SEQUENCE {
   spCellConfigCommon                     ServingcellConfigCommon          OPTIONAL,
   newUE-Identity                         RNTI-Value,
   t304                             ENUMERATED {ms50, ms100, ms150, ms200, ms500, ms1000, ms2000, ms10000},
   rach-ConfigDedicated              CHOICE {
     upink                            RACH-ConfigDedicated,
     supplementaryUplink              RACH-ConfigDedicated
   }                          OPTIONAL,
   ...
}
```

FIG. 7

```
        <OMITTED>
SCG-Configuration-r12 ::=          CHOICE {
   release                         NULL,
   setup                        SEQUENCE {
      scg-ConfigPartMCG-r12            SEQUENCE {
         scg-Counter-r12                  INTEGER (0.. 65535)        OPTIONAL,
         powerCoordinationInfo-r12        PowerCoordinationInfo-r12  OPTIONAL,
         ...
      }                                                      OPTIONAL,
      scg-ConfigPartSCG-r12            SCG-ConfigPartSCG-r12      OPTIONAL
   }
}
   <PARTLY OMITTED>
SCG-ConfigPartSCG-r12 ::=          SEQUENCE {
   radioResourceConfigDedicatedSCG-r12    RadioResourceConfigDedicatedSCG-r12   OPTIONAL,
   sCellToReleaseListSCG-r12           SCellToReleaseList-r10      OPTIONAL,
   pSCellToAddMod-r12                  PSCellToAddMod-r12             OPTIONAL,
   sCellToAddModListSCG-r12            SCellToAddModList-r10      OPTIONAL,
   mobilityControlInfoSCG-r12       MobilityControlInfoSCG-r12 OPTIONAL,
   <PARTLY OMITTED>
}
   <OMITTED>
```

FIG. 8

TERMINAL APPARATUS, BASE STATION APPARATUS, AND METHOD

TECHNICAL FIELD

The present invention relates to a terminal apparatus, a base station apparatus, and a method.

The present application claims priority to Japanese Patent Application No. 2021-149943 filed in Japan on Sep. 15, 2021, the contents of which are incorporated herein by reference.

BACKGROUND ART

In the 3rd Generation Partnership Project (3GPP: trade name, the same shall apply hereinafter) being a standardization project for cellular mobile communication systems, technical study and standardization are being carried out regarding cellular mobile communication systems including radio access, core networks, and services.

For example, technical study and standardization of Evolved Universal Terrestrial Radio Access (E-UTRA) have begun in the 3GPP as a Radio Access Technology (RAT) for cellular mobile communication systems for the 3.9th generation and the 4th generation. Technical study and standardization of enhanced technology of E-UTRA are still being carried out in the 3GPP. Note that E-UTRA may also be referred to as Long Term Evolution (LTE: trade name), and its enhanced technology may also be referred to as LTE-Advanced (LTE-A) and LTE-Advanced Pro (LTE-A Pro).

Technical study and standardization of New Radio or NR Radio access (NR) have begun in the 3GPP as a radio access technology (RAT) for cellular mobile communication systems for the 5th generation (5G). Technical study and standardization of enhanced technology of NR are still carried out in the 3GPP.

CITATION LIST

Non Patent Literature

NPL 1: 3GPP TS 38.300 v16.4.0, "NR; NR and NG-RAN Overall description: Stage 2" pp. 10-134

NPL 2: 3GPP TS 36.300 v16.4.0, "Evolved Universal Terrestrial Radio Access (E-UTRA) and Evolved Universal Terrestrial Radio Access Network (E-UTRAN); Overall description; Stage 2" pp. 19-362

NPL 3: 3GPP TS 38.331 v16.3.1, "NR; Radio Resource Control (RRC); Protocol specifications" pp. 21-881

NPL 4: 3GPP TS 36.331 v16.3.0, "Evolved Universal Terrestrial Radio Access (E-UTRA); Radio Resource Control (RRC); Protocol specifications" pp. 25-1015

NPL 5: 3GPP TS 37.340 v16.4.0, "Evolved Universal Terrestrial Radio Access (E-UTRA) and NR; Multi-Connectivity; Stage 2" pp. 7-77

NPL 6: 3GPP TS 38.321 v16.3.0, "NR; Medium Access Control (MAC) protocol specification" pp. 8-152

SUMMARY OF INVENTION

Technical Problem

As an enhanced technology of NR, in order to enable data communication with a large capacity, there is a dual connectivity (also referred to as multi-connectivity) technology, in which one or multiple base station apparatuses and a terminal apparatus communicate with each other using multiple cell groups. In dual connectivity, in order to perform communication in each of the cell groups, the terminal apparatus needs to monitor whether there is a message addressed to the terminal apparatus itself in each of the cell groups. In order to enable the terminal apparatus to perform communication with a small delay in a case that data communication with a large capacity occurs, the terminal apparatus needs to continuously monitor multiple cell groups, consuming a large amount of power. Therefore, technical study has begun on a technology for infrequently monitoring some cell groups or stopping the monitoring (a cell group deactivation technology).

An aspect of the present invention is made in view of the circumstances described above, and has an object to provide a terminal apparatus, a base station apparatus, a method, and an integrated circuit that enable efficient communication control.

Solution to Problem

In order to accomplish the object described above, an aspect of the present invention is contrived to provide the following means. In other words, an aspect of the present invention is a terminal apparatus that communicates with a base station apparatus, the terminal apparatus including: a processing unit configured to perform communication using an MCG and an SCG; and a receiver configured to receive an SCG deactivation command from the base station apparatus and receive an SCG activation command from the base station apparatus, in which the MCG includes at least a PCell, the SCG includes at least a PSCell, the processing unit deactivates the SCG in a case of receiving the SCG deactivation command, the processing unit determines not to perform beam failure detection on the PSCell in a deactivated state of the SCG in accordance with the fact that the deactivation command includes information indicating that beam failure detection is not performed, the processing unit indicates a MAC entity of the SCG of the terminal apparatus not to perform beam failure detection on the PSCell in the deactivated state of the SCG in a case of determining not to perform beam failure detection on the PSCell in the deactivated state of the SCG, and the processing unit activates the SCG in a case of receiving the SCG activation command and indicates the MAC entity of the SCG of the terminal apparatus to start (resume) beam failure detection on the PSCell in an activated state of the SCG.

An aspect of the present invention is a base station apparatus that communicates with a terminal apparatus, the base station apparatus including: a processing unit configured to communicate with the terminal apparatus; and a transmitter configured to transmit an SCG deactivation command to the terminal apparatus and to transmit an SCG activation command to the terminal apparatus, in which an SCG configured for the terminal apparatus includes at least a PSCell, the transmitter causes the terminal apparatus to deactivate the SCG by transmitting the SCG deactivation command to the terminal apparatus, the base station apparatus causes the terminal apparatus, by including information indicating that beam failure detection is not performed in the SCG deactivation command, to determine not to perform beam failure detection on the PSCell in a deactivated state of the SCG, and causes the terminal apparatus not to perform beam failure detection on the PSCell in the deactivated state of the SCG by causing the terminal apparatus to determine not to perform beam failure detection on the PSCell in the deactivated state of the SCG, and the base station apparatus causes the terminal apparatus to activate the SCG by transmitting the SCG activation command, and causes the SCG to start (resume) beam failure detection on the PSCell in an activated state of the SCG.

An aspect of the present invention is a method of a base station apparatus that communicates with a terminal apparatus, the method including the steps of: performing communication with the terminal apparatus; transmitting an SCG deactivation command to the terminal apparatus; and transmitting an SCG activation command to the terminal apparatus, in which an SCG configured for the terminal apparatus includes at least a PSCell, and the method further comprising the steps of: causing the terminal apparatus to deactivate the SCG by transmitting the SCG deactivation command to the terminal apparatus; causing the terminal apparatus, by including information indicating that beam failure detection is not performed in the SCG deactivation command, to determine not to perform beam failure detection on the PSCell in a deactivated state of the SCG; causing the terminal apparatus not to perform beam failure detection in the deactivated state of the SCG by causing the terminal apparatus to determine not to perform beam failure detection on the PSCell in the deactivated state of the SCG; causing the terminal apparatus to activate the SCG in a case of transmitting the SCG activation command; and causing the SCG to start (resume) beam failure detection on the PSCell in an activated state of the SCG.

An aspect of the present invention is an integrated circuit implemented in a terminal apparatus that communicates with a base station apparatus, the integrated circuit causing the terminal apparatus to perform a function of performing communication using an MCG and an SCG and a function of receiving an SCG deactivation command from the base station apparatus and receiving an SCG activation command from the base station apparatus, in which the MCG includes at least a PCell, the SCG includes at least a PSCell, the integrated circuit deactivates the SCG in a case of receiving the SCG deactivation command, the integrated circuit determines not to perform beam failure detection on the PSCell in a deactivated state of the SCG according to the fact that the deactivation command includes information indicating that beam failure detection is not performed, the integrated circuit indicates to a MAC entity of the SCG of the terminal apparatus not to perform beam failure detection on the PSCell in the deactivated state of the SCG in a case of determining not to perform beam failure detection on the PSCell in the deactivated state of the SCG, and the integrated circuit activates the SCG in a case of receiving the SCG activation command and indicates to the MAC entity of the SCG of the terminal apparatus to start (resume) beam failure detection on the PSCell in an activated state of the SCG.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus, the base station apparatus, the method, and the integrated circuit can implement efficient communication control processing.

BRIEF DESCRIPTION OF DRAWINGS

FIG. 7 is an example of an ASN.1 notation included in a message related to reconfiguration of RRC connection in NR according to an embodiment of the present invention.

FIG. 8 is an example of an ASN.1 notation included in a message related to reconfiguration of RRC connection in E-UTRA according to an embodiment of the present invention.

DESCRIPTION OF EMBODIMENTS

Hereinafter, an embodiment of the present invention will be described in detail with reference to the drawings.

LTE (and LTE-A, LTE-A Pro) and NR may be defined as different Radio Access Technologies (RATs). NR may be defined as a technology included in LTE. LTE may be defined as a technology included in NR. LTE that is connectible to NR by using Multi Radio Dual connectivity (MR-DC) may be distinguished from existing LTE. LTE using a 5GC as a core network may be distinguished from existing LTE using an EPC as a core network. Note that existing LTE may refer to LTE in which a technology standardized in release 15 or later versions of 3GPP is not implemented. An embodiment of the present invention may be applied to NR, LTE, and other RATs. Terms associated with LTE and NR are used in the following description. However, an embodiment of the present invention may be applied to other technologies using other terms. In an embodiment of the present invention, the term "E-UTRA" may be replaced with "LTE," and the term "LTE" may be replaced with "E-UTRA."

Note that, in an embodiment of the present invention, the terms of each node and entity, processing in each node and entity, and the like in a case that the radio access technology is E-UTRA or NR will be described. However, an embodiment of the present invention may be used for another radio access technology. The terms each node and entity in an embodiment of the present invention may be other terms.

Figure 1:
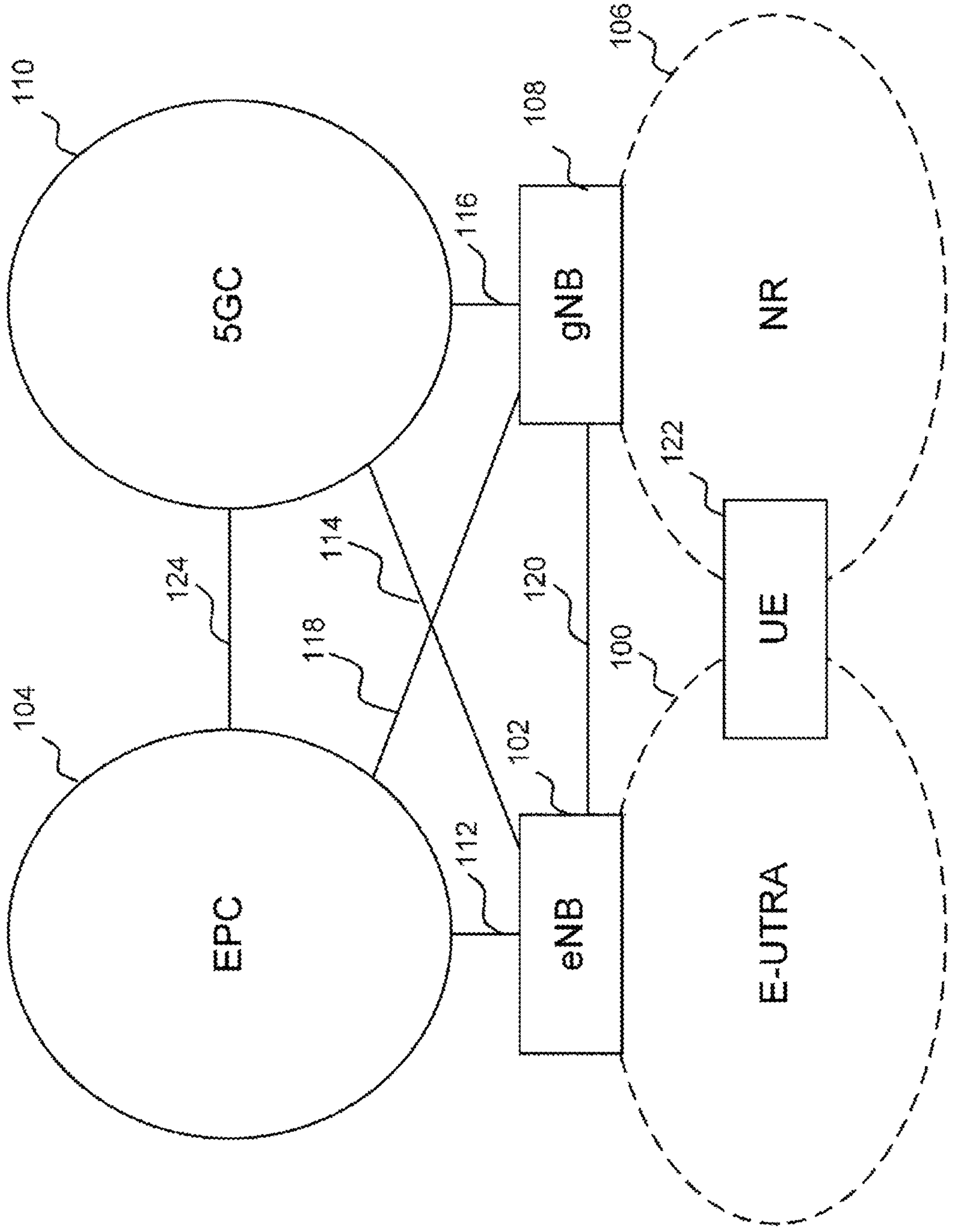
FIG. 1 is a schematic diagram of a communication system according to an embodiment of the present invention.

FIG. 1 is a schematic diagram of a communication system according to an embodiment of the present invention. Note that functions of each node, radio access technology, core network, interface, and the like to be described with reference to FIG. 1 are a part of functions closely related to an embodiment of the present invention, and other functions may be provided.

E-UTRA 100 may be a radio access technology. The E-UTRA 100 may be an air interface between a UE 122 and an eNB 102. The air interface between the UE 122 and the eNB 102 may be referred to as a Uu interface. The E-UTRAN Node B (eNB) 102 may be a base station apparatus of the E-UTRA 100. The eNB 102 may have an E-UTRA protocol to be described below. The E-UTRA protocol may include an E-UTRA User Plane (UP) protocol to be described below and an E-UTRA Control Plane (CP) protocol to be described below. The eNB 102 may terminate the E-UTRA User Plane (UP) protocol and the E-UTRA Control Plane (CP) protocol for the UE 122. A radio access network including the eNB may be referred to as an E-UTRAN.

An Evolved Packet Core (EPC) 104 may be a core network. An interface 112 is an interface between the eNB 102 and the EPC 104, and may be referred to as an S1 interface. The interface 112 may include a control plane interface through which a control signal passes and/or a user plane interface through which user data passes. The control plane interface of the interface 112 may be terminated in a Mobility Management Entity (MME) (not illustrated) in the EPC 104. The user plane interface of the interface 112 may be terminated in a serving gateway (S-GW) (not illustrated) in the EPC 104. The control plane interface of the interface 112 may be referred to as an S1-MME interface. The user plane interface of the interface 112 may be referred to as an S1-U interface.

Note that one or multiple eNBs 102 may be connected to the EPC 104 via the interface 112. Among the multiple eNBs 102 connected to the EPC 104, an interface may be present (not illustrated). The interface among the multiple eNBs 102 connected to the EPC 104 may be referred to as an X2 interface.

An NR 106 may be a radio access technology. The NR 106 may be an air interface between the UE 122 and a gNB 108. The air interface between the UE 122 and the gNB 108 may be referred to as a Uu interface. The gNode B (gNB) 108 may be a base station apparatus of the NR 106. The gNB 108 may have an NR protocol to be described below. The NR protocol may include an NR User Plane (UP) protocol to be described below and an NR Control Plane (CP) protocol to be described below. The gNB 108 may terminate the NR User Plane (UP) protocol and the NR Control Plane (CP) protocol for the UE 122.

A 5GC 110 may be a core network. An interface 116 is an interface between the gNB 108 and the 5GC 110, and may be referred to as an NG interface. The interface 116 may include a control plane interface through which a control signal passes and/or a user plane interface through which user data passes. The control plane interface of the interface 116 may be terminated in an Access and mobility Management Function (AMF) (not illustrated) in the 5GC 110. The user plane interface of the interface 116 may be terminated in a User Plane Function (UPF) (not illustrated) in the 5GC 110. The control plane interface of the interface 116 may be referred to as an NG-C interface. The user plane interface of the interface 116 may be referred to as an NG-U interface.

Note that one or multiple gNBs 108 may be connected to the 5GC 110 via the interface 116. Among the multiple gNBs 108 connected to the 5GC 110, an interface may be present (not illustrated). The interface among the multiple gNBs 108 connected to the 5GC 110 may be referred to as an Xn interface.

The eNB 102 may have a function of connecting to the 5GC 110. The eNB 102 having the function of connecting to the 5GC 110 may be referred to as an ng-eNB. An interface 114 is an interface between the eNB 102 and the 5GC 110, and may be referred to as an NG interface. The interface 114 may include a control plane interface through which a control signal passes and/or a user plane interface through which user data passes. The control plane interface of the interface 114 may be terminated in an Access and mobility Management Function (AMF) (not illustrated) in the 5GC 110. The user plane interface of the interface 114 may be terminated in a User Plane Function (UPF) (not illustrated) in the 5GC 110. The control plane interface of the interface 114 may be referred to as an NG-C interface. The user plane interface of the interface 114 may be referred to as an NG-U interface. A radio access network including the ng-eNB or the gNB may be referred to as an NG-RAN. The NG-RAN, the E-UTRAN, the eNB, the ng-eNB, the gNB, or the like may be simply referred to as a network.

Note that one or multiple eNBs 102 may be connected to the 5GC 110 via the interface 114. Among the multiple eNBs 102 connected to the 5GC 110, an interface may be present (not illustrated). The interface among the multiple eNBs 102 connected to the 5GC 110 may be referred to as an Xn interface. The eNB 102 connected to the 5GC 110 and the gNB 108 connected to the 5GC 110 may be connected with an interface 120. The interface 120 between the eNB 102 connected to the 5GC 110 and the gNB 108 connected to the 5GC 110 may be referred to as an Xn interface.

The gNB 108 may have a function of connecting to the EPC 104. The gNB 108 having the function of connecting to the EPC 104 may be referred to as an en-gNB. An interface 118 is an interface between the gNB 108 and the EPC 104, and may be referred to as an S1 interface. The interface 118 may include a user plane interface through which user data passes. The user plane interface of the interface 118 may be terminated in an S-GW (not illustrated) in the EPC 104. The user plane interface of the interface 118 may be referred to as an S1-U interface. The eNB 102 connected to the EPC 104 and the gNB 108 connected to the EPC 104 may be connected with the interface 120. The interface 120 between the eNB 102 connected to the EPC 104 and the gNB 108 connected to the EPC 104 may be referred to as an X2 interface.

An interface 124 is an interface between the EPC 104 and the 5GC 110, and may be an interface that allows only the CP, only the UP, or both of the CP and the UP to pass therethrough. A part or all of the interfaces out of the interface 114, the interface 116, the interface 118, the interface 120, the interface 124, and the like may be absent depending on a communication system provided by a communication provider or the like.

The UE 122 may be a terminal apparatus that can receive broadcast information and a paging message transmitted from the eNB 102 and/or the gNB 108. The UE 122 may be a terminal apparatus that can establish a radio connection to the eNB 102 and/or the gNB 108. The UE 122 may be a terminal apparatus that can simultaneously establish a radio connection to the eNB 102 and a radio connection to the gNB 108. The UE 122 may have the E-UTRA protocol and/or the NR protocol. Note that the radio connection may be a Radio Resource Control (RRC) connection.

In a case that the UE 122 communicates with the eNB 102 and/or the gNB 108, Radio Bearers (RBs) may be established between the UE 122 and the eNB 102 and/or the gNB 108 to establish a radio connection. The radio bearer used for the CP may be referred to as a Signaling Radio Bearer (SRB). The radio bearer used for the UP may be referred to as a data radio bearer (DRB Data Radio Bearer). Each radio bearer may be assigned a radio bearer identity (Identity) (ID). The radio bearer identity for the SRB may be referred to as an SRB identity (SRB Identity or SRB ID). The radio bearer identity for the DRB may be referred to as a DRB identity (DRB Identity or DRB ID).

The UE 122 may be a terminal apparatus that can connect to the EPC 104 and/or the 5GC 110 via the eNB 102 and/or the gNB 108. In a case that a connection destination core network of the eNB 102 and/or the gNB 108 with which the UE 122 performs communication is the EPC 104, each DRB established between the UE 122 and the eNB 102 and/or the gNB 108 may further be uniquely associated with each Evolved Packet System (EPS) bearer passing through the EPC 104. Each EPS bearer may be identified with an EPS bearer identity (Identity or ID). The same QoS may be secured for data, such as an IP packet and an Ethernet (trade name) frame, which passes through the same EPS bearer.

In a case that the connection destination core network of the eNB 102 and/or the gNB 108 with which the UE 122 performs communication is the 5GC 110, each DRB established between the UE 122 and the eNB 102 and/or the gNB 108 may further be associated with one of Packet Data Unit (PDU) sessions established in the 5GC 110. Each PDU session may include one or multiple QoS flows. Each DRB may be associated with (mapped to) one or multiple Qos flows, or may be associated with none of the QoS flows. Each PDU session may be identified with a PDU session Identifier (Identity, or ID). Each QoS flow may be identified with a Qos flow Identifier (Identity, or ID). The QoS may be secured for data, such as an IP packet and an Ethernet frame, which passes through the same QoS flow.

The EPC 104 need not include the PDU session(s) and/or the QoS flow(s). The 5GC 110 need not include the EPS bearer(s). In a case that the UE 122 is connected to the EPC 104, the UE 122 may have information of the EPS bearer(s) but need not have information in the PDU session(s) and/or the QoS flow(s). In a case that the UE 122 is connected to the 5GC 110, the UE 122 may have information in the PDU session(s) and/or the QoS flow(s) but need not have information of the EPS bearer(s).

Note that, in the following description, the eNB 102 and/or the gNB 108 is also simply referred to as a base station apparatus, and the UE 122 is also simply referred to as a terminal apparatus or a UE.

Figure 2:
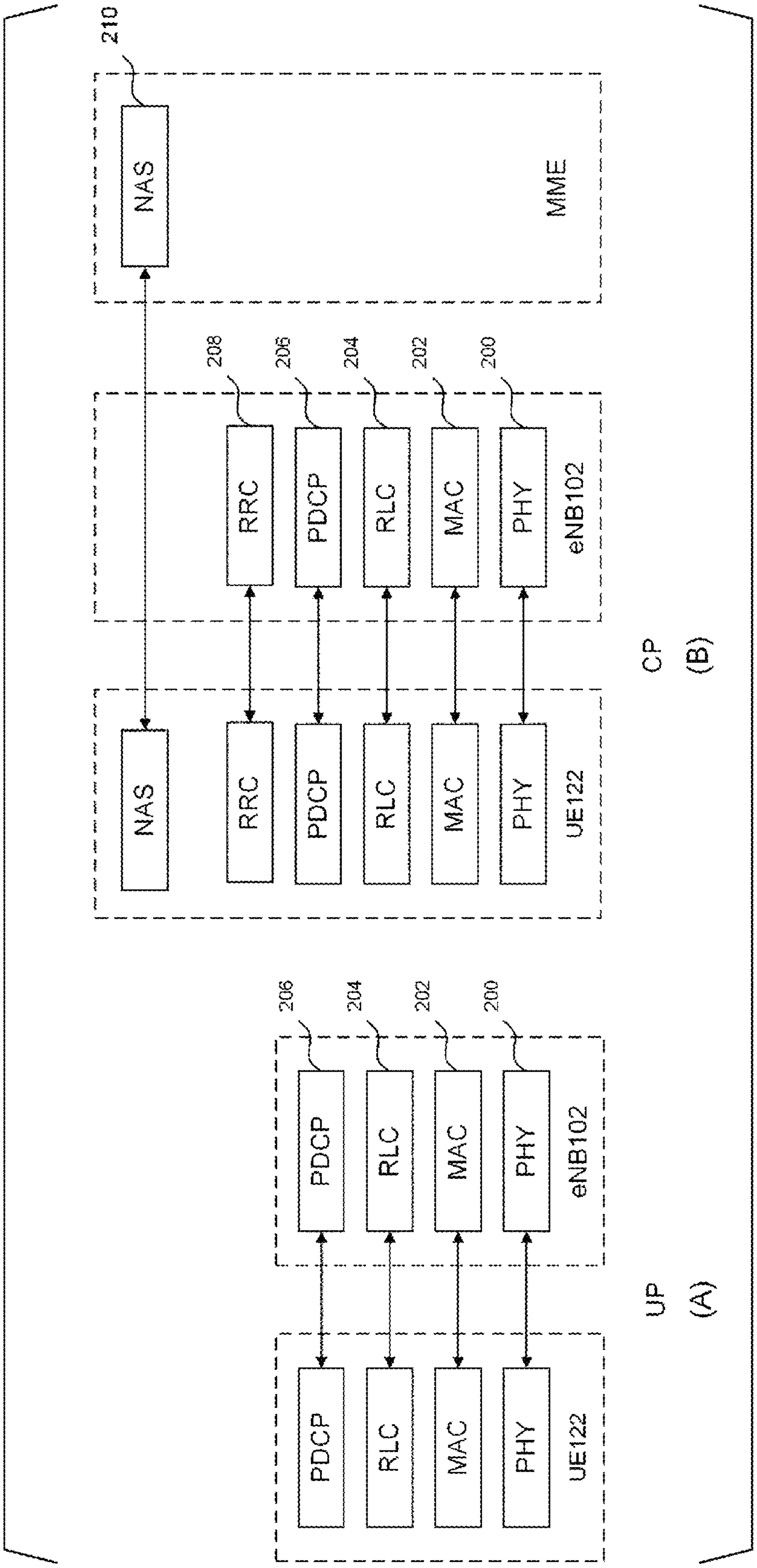
FIG. 2 is a diagram of an example of an E-UTRA protocol architecture according to an embodiment of the present invention.
Figure 3:
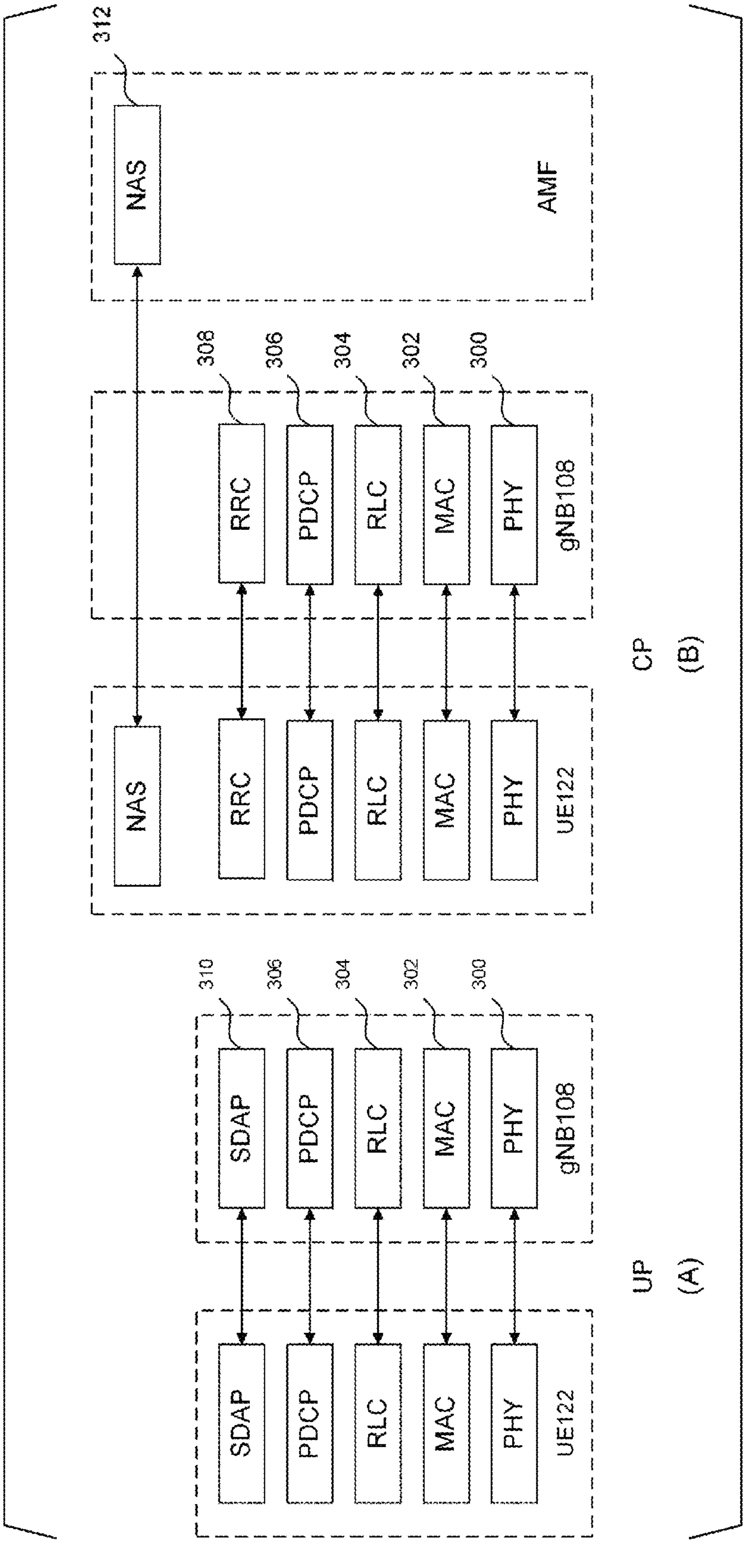
FIG. 3 is a diagram of an example of an NR protocol architecture according to an embodiment of the present invention.

FIG. 2 is a diagram of an example of an E-UTRA protocol architecture according to an embodiment of the present invention. FIG. 3 is a diagram of an example of an NR protocol architecture according to an embodiment of the present invention. Note that functions of each protocol to be described with reference to FIG. 2 and/or FIG. 3 are a part of functions closely related to an embodiment of the present invention, and other functions may be provided. Note that, in an embodiment of the present invention, an uplink (UL) may be a link from the terminal apparatus to the base station apparatus. In an embodiment of the present invention, a downlink (DL) may be a link from the base station apparatus to the terminal apparatus.

FIG. 2(A) is a diagram of an E-UTRA user plane (UP) protocol stack. As illustrated in FIG. 2(A), the E-UTRAN UP protocol may be a protocol between the UE 122 and the eNB 102. In other words, the E-UTRAN UP protocol may be a protocol terminated in the eNB 102 at a network side. As illustrated in FIG. 2(A), the E-UTRA user plane protocol stack may include a Physical layer (PHY) 200 which is a radio physical layer, a Medium Access Control (MAC) 202 which is a medium access control layer, a Radio Link Control (RLC) 204 which is a radio link control layer, and a Packet Data Convergence Protocol (PDCP) 206 which is a packet data convergence protocol layer.

FIG. 3(A) is a diagram of an NR user plane (UP) protocol stack. As illustrated in FIG. 3(A), the NR UP protocol may be a protocol between the UE 122 and the gNB 108. In other words, the NR UP protocol may be a protocol terminated in the gNB 108 at a network side. As illustrated in FIG. 3(A), the E-UTRA user plane protocol stack may include a PHY 300 which is a radio physical layer, a MAC 302 which is a medium access control layer, an RLC 304 which is a radio link control layer, a PDCP 306 which is a packet data convergence protocol layer, and a service data adaptation protocol (SDAP) 310 which is a service data adaptation protocol layer.

FIG. 2(B) is a diagram of an E-UTRA control plane (CP) protocol architecture. As illustrated in FIG. 2(B), in the E-UTRAN CP protocol, a Radio Resource Control (RRC) 208 being a radio resource control layer may be a protocol between the UE 122 and the eNB 102. In other words, the RRC 208 may be a protocol terminated in the eNB 102 at a network side. In the E-UTRAN CP protocol, a Non Access Stratum (NAS) 210 being a non Access Stratum (AS) layer (non AS layer) may be a protocol between the UE 122 and the MME. In other words, the NAS 210 may be a protocol terminated in the MME at a network side.

FIG. 3(B) is a diagram of an NR control plane (CP) protocol architecture. As illustrated in FIG. 3(B), in the NR CP protocol, an RRC 308 being a radio resource control layer may be a protocol between the UE 122 and the gNB 108. In other words, the RRC 308 may be a protocol terminated in the gNB 108 at a network side. In the E-UTRAN CP protocol, a NAS 312 being a non AS layer may be a protocol between the UE 122 and the AMF. In other words, the NAS 312 may be a protocol terminated in the AMF at a network side.

Note that the Access Stratum (AS) layer may be a layer terminated between the UE 122 and the eNB 102 and/or the gNB 108. In other words, the AS layer may be a layer including a part or all of the PHY 200, the MAC 202, the RLC 204, the PDCP 206, and the RRC 208, and/or a layer including a part or all of the PHY 300, the MAC 302, the RLC 304, the PDCP 306, the SDAP 310, and the RRC 308.

Note that, in an embodiment of the present invention, terms such as a PHY (PHY layer), a MAC (MAC layer), an RLC (RLC layer), a PDCP (PDCP layer), an RRC (RRC layer), and a NAS (NAS layer) may be hereinafter used, without the protocol of E-UTRA and the protocol of NR being distinguished from each other. In this case, the PHY (PHY layer), the MAC (MAC layer), the RLC (RLC layer), the PDCP (PDCP layer), the RRC (RRC layer), and the NAS (NAS layer) may be the PHY (PHY layer), the MAC (MAC layer), the RLC (RLC layer), the PDCP (PDCP layer), the RRC (RRC layer), and the NAS (NAS layer) of the E-UTRA protocol, or may be the PHY (PHY layer), the MAC (MAC layer), the RLC (RLC layer), the PDCP (PDCP layer), the RRC (RRC layer), and the NAS (NAS layer) of the NR protocol, respectively. The SDAP (SDAP layer) may be the SDAP (SDAP layer) of the NR protocol.

In an embodiment of the present invention, in a case that the protocol of E-UTRA and the protocol of NR are distinguished from each other, the PHY 200, the MAC 202, the RLC 204, the PDCP 206, and the RRC 208 may be hereinafter referred to as the PHY for E-UTRA or the PHY for LTE, the MAC for E-UTRA or the MAC for LTE, the RLC for E-UTRA or the RLC for LTE, the PDCP for E-UTRA or the PDCP for LTE, and the RRC for E-UTRA or the RRC for LTE, respectively. The PHY 200, the MAC 202, the RLC 204, the PDCP 206, and the RRC 208 may be referred to as an E-UTRA PHY or an LTE PHY, an E-UTRA MAC or an LTE MAC, an E-UTRA RLC or an LTE RLC, an E-UTRA PDCP or an LTE PDCP, an E-UTRA RRC or an LTE RRC, and the like, respectively. In a case that the protocol of E-UTRA and the protocol of NR are distinguished from each other, the PHY 300, the MAC 302, the RLC 304, the PDCP 306, and the RRC 308 may be referred to as a PHY for NR, a MAC for NR, an RLC for NR, an RLC for NR, and an RRC for NR, respectively. The PHY 200, the MAC 302, the RLC 304, the PDCP 306, and the RRC 308 may be referred to as an NR PHY, an NR MAC, an NR RLC, an NR PDCP, an NR RRC, and the like, respectively.

Entities in the AS layer of E-UTRA and/or NR will be described. An entity having a part or all of functions of the MAC layer may be referred to as a MAC entity. An entity having a part or all of functions of the RLC layer may be referred to as an RLC entity. An entity having a part or all of functions of the PDCP layer may be referred to as a PDCP entity. An entity having a part or all of functions of the SDAP layer may be referred to as an SDAP entity. An entity having a part or all of functions of the RRC layer may be referred to as an RRC entity. The MAC entity, the RLC entity, the PDCP entity, the SDAP entity, and the RRC entity may be alternatively referred to as a MAC, an RLC, a PDCP, an SDAP, and an RRC, respectively.

Note that data provided from the MAC, the RLC, the PDCP, and the SDAP to a lower layer, and/or data provided to the MAC, the RLC, the PDCP, and the SDAP from a lower layer may be referred to as a MAC Protocol Data Unit (PDU), an RLC PDU, a PDCP PDU, and an SDAP PDU, respectively. Data provided to the MAC, the RLC, the PDCP, and the SDAP from a higher layer, and/or data provided from the MAC, the RLC, the PDCP, and the SDAP to a higher layer may be referred to as a MAC Service Data Unit (SDU), an RLC SDU, a PDCP SDU, and an SDAP SDU, respectively. A segmented RLC SDU may be referred to as an RLC SDU segment.

An example of the functions of the PHY will be described. The PHY of the terminal apparatus may have a function of receiving data transmitted from the PHY of the base station apparatus via a Downlink (DL) Physical Channel. The PHY of the terminal apparatus may have a function of transmitting data to the PHY of the base station apparatus via an Uplink (UL) physical channel. The PHY may be connected to an upper MAC with a Transport Channel. The PHY may deliver data to the MAC via the transport channel. The PHY may be provided with data from the MAC via the transport channel. In the PHY, in order to identify various pieces of control information, a Radio Network Temporary Identifier (RNTI) may be used.

Here, the physical channels will be described.

The physical channels used for radio communication between the terminal apparatus and the base station apparatus may include the following physical channels.

Physical Broadcast CHannel (PBCH)

Physical Downlink Control CHannel (PDCCH)

Physical Downlink Shared CHannel (PDSCH)

Physical Uplink Control CHannel (PUCCH)

Physical Uplink Shared CHannel (PUSCH)

Physical Random Access CHannel (PRACH)

The PBCH may be used to broadcast system information required by the terminal apparatus.

The PBCH may be used to broadcast time indexes (SSB-Indexes) within the periodicity of synchronization signal blocks (also referred to as SS/PBCH blocks) in NR.

The PDCCH may be used to transmit (or carry) Downlink Control Information (DCI) in downlink radio communication (radio communication from the base station apparatus to the terminal apparatus). Here, one or multiple pieces of DCI (which may be referred to as DCI formats) may be defined for transmission of the downlink control information. In other words, a field for the downlink control information may be defined as DCI and may be mapped to information bits. The PDCCH may be transmitted in PDCCH candidates. The terminal apparatus may monitor a set of PDCCH candidates in a serving cell. To monitor a set of PDCCH candidates may mean an attempt to decode the PDCCH in accordance with a certain DCI format. The DCI format may be used for scheduling of the PUSCH in the serving cell. The PUSCH may be used for transmission of user data, transmission of RRC messages to be described below, and the like.

The PUCCH is used to transmit Uplink Control Information (UCI) in a case of uplink radio communication (radio communication from the terminal apparatus to the base station apparatus). Here, the uplink control information may include Channel State Information (CSI) used to indicate a downlink channel state. The uplink control information may include a Scheduling Request (SR) used for requesting Uplink Shared CHannel (UL-SCH) resources. The uplink control information may include a Hybrid Automatic Repeat reQuest ACKnowledgement (HARQ-ACK).

The PDSCH may be used to transmit downlink data (Downlink Shared CHannel (DL-SCH)) from the MAC layer. In a case of the downlink, the PDSCH may be used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. The PUSCH may be used to transmit CSI only or a HARQ-ACK and CSI only. In other words, the PUSCH may be used to transmit the UCI only. The PDSCH or the PUSCH may be used to transmit RRC signaling (also referred to as an RRC message) and a MAC control element. In this regard, in the PDSCH, the RRC signaling transmitted from the base station apparatus may be signaling common to multiple terminal apparatuses in a cell. The RRC signaling transmitted from the base station apparatus may be dedicated signaling for a certain terminal apparatus (also referred to as dedicated signaling). In other words, terminal apparatus-specific (UE-specific) information may be transmitted through dedicated signaling to the certain terminal apparatus. Additionally, the PUSCH may be used to transmit UE capabilities in the uplink.

The PRACH may be used for transmitting a random access preamble. The PRACH may be used to indicate an initial connection establishment procedure, a handover procedure, a connection re-establishment procedure, synchronization (timing adjustment) for uplink transmission, and a request for a UL-SCH resource.

An example of the functions of the MAC will be described. The MAC may be referred to as a MAC sublayer. The MAC may have a function of mapping various Logical Channels to their corresponding transport channels. The logical channel may be identified with a logical channel identifier (Logical Channel Identity or Logical Channel ID). The MAC may be connected to an upper RLC with a logical channel. The logical channel may be classified into a control channel for transmitting control information and a traffic channel for transmitting user information depending on the type of information to be transmitted. The logical channel may be classified into an uplink logical channel and a downlink logical channel. The MAC may have a function of multiplexing MAC SDUs belonging to one or multiple different logical channels and providing the multiplexed MAC SDUs to the PHY. The MAC may have a function of demultiplexing the MAC PDUs provided from the PHY and providing the demultiplexed MAC PDUs to a higher layer via the logical channels to which the respective MAC SDUs belong. The MAC may have a function of performing error correction through a Hybrid Automatic Repeat reQuest (HARQ). The MAC may have a Scheduling Report (SR) function of reporting scheduling information. The MAC may have a function of performing priority processing among the terminal apparatuses by using dynamic scheduling. The MAC may have a function of performing priority processing among the logical channels in one terminal apparatus. The MAC may have a function of performing priority processing of resources overlapping in one terminal apparatus. The E-UTRA MAC may have a function of identifying Multimedia Broadcast Multicast Services (MBMS). The NR MAC may have a function of identifying a Multicast Broadcast Service (MBS). The MAC may have a function of selecting a transport format. The MAC may have a function of performing Discontinuous Reception (DRX) and/or Discontinuous Transmission (DTX), a function of performing a Random Access (RA) procedure, a Power Headroom Report (PHR) function of reporting information of transmittable power, a Buffer Status Report (BSR) function of reporting data volume information of a transmission buffer, and the like. The NR MAC may have a Bandwidth Adaptation (BA) function. A MAC PDU format used in the E-UTRA MAC and a MAC PDU format used in the NR MAC may be different from each other. The MAC PDU may include a MAC control element (MAC CE) being an element for performing control in the MAC.

Uplink (UL) and/or Downlink (DL) logical channels used in E-UTRA and/or NR will be described.

A Broadcast Control Channel (BCCH) may be a downlink logical channel for broadcasting control information, such as System Information (SI).

A Paging Control Channel (PCCH) may be a downlink logical channel for carrying a Paging message.

A Common Control Channel (CCCH) may be a logical channel for transmitting control information between the terminal apparatus and the base station apparatus. The CCCH may be used in a case that the terminal apparatus does not have an RRC connection. The CCCH may be used between the base station apparatus and multiple terminal apparatuses.

A Dedicated Control Channel (DCCH) may be a logical channel for transmitting dedicated control information in a point-to-point bi-directional manner between the terminal apparatus and the base station apparatus. The dedicated control information may be control information dedicated to each terminal apparatus. The DCCH may be used in a case that the terminal apparatus has an RRC connection.

A Dedicated Traffic Channel (DTCH) may be a logical channel for transmitting user data in a point-to-point manner between the terminal apparatus and the base station apparatus. The DTCH may be a logical channel for transmitting dedicated user data. The dedicated user data may be user data dedicated to each terminal apparatus. The DTCH may be present in both of the uplink and the downlink.

Mapping between the logical channels and the transport channels in uplink, in E-UTRA and/or NR will be described.

The CCCH may be mapped to an Uplink Shared Channel (UL-SCH) being an uplink transport channel.

The DCCH may be mapped to an Uplink Shared Channel (UL-SCH) being an uplink transport channel.

The DTCH may be mapped to an Uplink Shared Channel (UL-SCH) being an uplink transport channel.

Mapping between the logical channels and the transport channels in downlink, in E-UTRA and/or NR will be described.

The BCCH may be mapped to a Broadcast Channel (BCH) and/or a Downlink Shared Channel (DL-SCH) being a downlink transport channel.

The PCCH may be mapped to a Paging Channel (PCH) being a downlink transport channel.

The CCCH may be mapped to a Downlink Shared Channel (DL-SCH) being a downlink transport channel.

The DCCH may be mapped to a Downlink Shared Channel (DL-SCH) being a downlink transport channel.

The DTCH may be mapped to a Downlink Shared Channel (DL-SCH) being a downlink transport channel.

An example of the functions of the RLC will be described. The RLC may be referred to as an RLC sublayer. The E-UTRA RLC may have a function of segmenting (Segmentation) and/or concatenating (Concatenation) data provided from the PDCP of a higher layer, and providing the segmented and/or concatenated data to a lower laver. The E-UTRA RLC may have a function of reassembling (reassembly) and re-ordering data provided from a lower layer, and providing the reassembled and re-ordered data to a higher layer. The NR RLC may have a function of assigning data provided from the PDCP of a higher layer with a sequence number independent of a sequence number assigned in the PDCP. The NR RLC may have a function of segmenting (segmentation) data provided from the PDCP and providing the segmented data to a lower layer. The NR RLC may have a function of reassembling (reassembly) data provided from a lower layer, and providing the reassembled data to a higher layer. The RLC may have a data retransmission function and/or retransmission request function (Automatic Repeat reQuest (ARQ)). The RLC may have a function of performing error correction using the ARQ. Control information that indicates data required to be retransmitted and that is transmitted from a receiving side to a transmitting side of the RLC in order to perform the ARQ may be referred to as a status report. A status report transmission indication transmitted from the transmitting side to the receiving side of the RLC may be referred to as a poll. The RLC may have a function of detecting data duplication. The RLC may have a function of discarding data. The RLC may have three modes, namely a Transparent Mode (TM), an Unacknowledged Mode (UM), and an Acknowledged Mode (AM). In the TM, segmentation of data received from a higher layer may not be performed, and addition of an RLC header may not be performed. A TM RLC entity may be a uni-directional entity, and may be configured as a transmitting TM RLC entity or as a receiving TM RLC entity. In the UM, segmentation and/or concatenation of data received from a higher layer, addition of an RLC header, and the like may be performed, but retransmission control of data may not be performed. A UM RLC entity may be a uni-directional entity, or may be a bi-directional entity. In a case that the UM RLC entity is a uni-directional entity, the UM RLC entity may be configured as a transmitting UM RLC entity or as a receiving UM RLC entity. In a case that the UM RLC entity is a bi-directional entity, the UM RRC entity may be configured as a UM RLC entity constituted with a transmitting side and a receiving side. In the AM, segmentation and/or concatenation of data received from a higher layer, addition of an RLC header, retransmission control of data, and the like may be performed. An AM RLC entity may be a bi-directional entity, and may be configured as an AM RLC constituted with a transmitting side and a receiving side. Note that data provided to a lower layer and/or data provided from a lower layer in the TM may be referred to as a TMD PDU. Data provided to a lower layer and/or data provided from a lower layer in the UM may be referred to as a UMD PDU. Data provided to a lower layer or data provided from a lower layer in the AM may be referred to as an AMD PDU. An RLC PDU format used in the E-UTRA RLC and an RLC PDU format used in the NR RLC may be different from each other. The RLC PDU may include an RLC PDU for data and an RLC PDU for control. The RLC PDU for data may be referred to as an RLC DATA PDU (RLC Data PDU, RLC data PDU). The RLC PDU for control may be referred to as an RLC CONTROL PDU (RLC Control PDU, RLC control PDU).

An example of the functions of the PDCP will be described. The PDCP may be referred to as a PDCP sublayer. The PDCP may have a function of maintenance of the sequence number. The PDCP may have a header compression and decompression function for efficiently transmitting, in wireless sections, user data such as an IP Packet and an Ethernet frame. A protocol used for header compression and decompression for an IP packet may be referred to as a Robust Header Compression (ROHC) protocol. A protocol used for header compression and decompression for an Ethernet frame may be referred to as an Ethernet (trade name) Header Compression (EHC) protocol. The PDCP may have a function of encrypting and decrypting data. The PDCP may have a function of data integrity protection and integrity verification. The PDCP may have a function of re-ordering. The PDCP may have a function of retransmitting the PDCP SDU. The PDCP may have a function of discarding data using a discard timer. The PDCP may have a Duplication function. The PDCP may have a function of discarding pieces of data received in a duplicate manner. The PDCP entity may be a bi-directional entity, and may include a transmitting PDCP entity and a receiving PDCP entity. A PDCP PDU format used in the E-UTRA PDCP and a PDCP PDU format used in the NR PDCP may be different from each other. The PDCP PDU may include a PDCP PDU for data and a PDCP PDU for control. The PDCP PDU for data may be referred to as a PDCP DATA PDU (PDCP Data PDU, PDCP data PDU). The PDCP PDU for control may be referred to as a PDCP CONTROL PDU (PDCP Control PDU, PDCP control PDU).

An example of the functions of the SDAP will be described. The SDAP is a service data adaptation protocol layer. The SDAP may have a function of performing association (mapping) between a downlink QoS flow transmitted from the 5GC 110 to the terminal apparatus via the base station apparatus and a data radio bearer (DRB) and/or mapping between an uplink QoS flow transmitted from the terminal apparatus to the 5GC 110 via the base station apparatus and a DRB. The SDAP may have a function of storing mapping rule information. The SDAP may have a function of performing marking of a QoS flow identifier (QOS Flow ID (QFI)). Note that the SDAP PDU may include an SDAP PDU for data and an SDAP PDU for control. The SDAP PDU for data may be referred to as an SDAP DATA PDU (SDAP Data PDU, SDAP data PDU). The SDAP PDU for control may be referred to as an SDAP CONTROL PDU (SDAP Control PDU, SDAP control PDU). Note that, in the terminal apparatus, one SDAP entity may be present for one PDU session.

An example of the functions of the RRC will be described. The RRC may have a broadcast function. The RRC may have a Paging function from the EPC 104 and/or the 5GC 110. The RRC may have a Paging function from the gNB 108 or the eNB 102 connected to the 5GC 100. The RRC may have an RRC connection management function. The RRC may have a radio bearer control function. The RRC may have a cell group control function. The RRC may have a mobility control function. The RRC may have a terminal apparatus measurement reporting and terminal apparatus measurement reporting control function. The RRC may have a QoS management function. The RRC may have a radio link failure detection and recovery function. The RRC may perform broadcasting, paging, RRC connection management, radio bearer control, cell group control, mobility control, terminal apparatus measurement reporting and terminal apparatus measurement reporting control, QoS management, detection and recovery of radio link failure, and the like by using the RRC message. Note that RRC messages and parameters used in the E-UTRA RRC may be different from RRC messages and parameters used in the NR RRC.

The RRC message may be transmitted using the BCCH of the logical channel, may be transmitted using the PCCH of the logical channel, may be transmitted using the CCCH of the logical channel, or may be transmitted using the DCCH of the logical channel.

In the RRC message transmitted using the BCCH, for example, a Master Information Block (MIB) may be included, a System Information Block (SIB) of each type may be included, or another RRC message may be included. In the RRC message transmitted using the PCCH, for example, a paging message may be included, or another RRC message may be included.

In the RRC message transmitted in the uplink (UL) direction using the CCCH, for example, an RRC setup request message (RRC Setup Request), an RRC resume request message (RRC Resume Request), an RRC reestablishment request message (RRC Reestablishment Request), an RRC system information request message (RRC System Info Request), and the like may be included. For example, an RRC connection request message (RRC Connection Request), an RRC connection resume request message (RRC Connection Resume Request), an RRC connection reestablishment request message (RRC Connection Reestablishment Request), and the like may be included. Another RRC message may be included.

In the RRC message transmitted in the downlink (DL) direction using the CCCH, for example, an RRC connection reject message (RRC Connection Reject), an RRC connection setup message (RRC Connection Setup), an RRC connection reestablishment message (RRC Connection Reestablishment), an RRC connection reestablishment reject message (RRC Connection Reestablishment Reject), and the like may be included. For example, an RRC reject message (RRC Reject), an RRC setup message (RRC Setup), and the like may be included. Another RRC message may be included.

In the RRC message transmitted in the uplink (UL) direction using the DCCH, for example, a measurement report message (Measurement Report), an RRC connection reconfiguration complete message (RRC Connection Reconfiguration Complete), an RRC connection setup complete message (RRC Connection Setup Complete), an RRC connection reestablishment complete message (RRC Connection Reestablishment Complete), a security mode complete message (Security Mode Complete), a UE capability information message (UE Capability Information), and the like may be included. For example, a measurement report message (Measurement Report), an RRC reconfiguration complete message (RRC Reconfiguration Complete), an RRC setup complete message (RRC Setup Complete), an RRC reestablishment complete message (RRC Reestablishment Complete), an RRC resume complete message (RRC Resume Complete), a security mode complete message (Security Mode Complete), a UE capability information message (UE Capability Information), and the like may be included. Another RRC message may be included.

In the RRC message transmitted in the downlink (DL) direction using the DCCH, for example, an RRC connection reconfiguration message (RRC Connection Reconfiguration), an RRC connection release message (RRC Connection Release), a security mode command message (Security Mode Command), a UE capability enquiry message (UE Capability Enquiry), and the like may be included. For example, an RRC reconfiguration message (RRC Reconfiguration), an RRC resume message (RRC Resume), an RRC release message (RRC Release), an RRC reestablishment message (RRC Reestablishment), a security mode command message (Security Mode Command), a UE capability enquiry message (UE Capability Enquiry), and the like may be included. Another RRC message may be included.

An example of the functions of the NAS will be described. The NAS may have an authentication function. The NAS may have a function of performing mobility management. The NAS may have a function of security control.

The functions of the PHY, the MAC, the RLC, the PDCP, the SDAP, the RRC, and the NAS described above are merely an example, and a part or all of each of the functions may not be implemented. Some or all of the functions of each layer may be included in another layer.

The state transition of the UE 122 in LTE and NR will now be described. Regarding the UE 122 connected to the EPC or the 5GC, the UE 122 may be in an RRC_CONNECTED state in a case that an RRC connection has been established. The state in which the RRC connection has been established may include a state in which the UE 122 retains a part or all of UE contexts to be described below. The state in which the RRC connection has been established may include a state in which the UE 122 can transmit and/or receive unicast data. Regarding the UE 122, in a case that the RRC connection is suspended, the UE 122 may be in an RRC_INACTIVE state. The case that the UE 122 is in the RRC_INACTIVE state may be a case that the UE 122 is connected to the 5GC and the RRC connection is suspended. In a case that the UE 122 is in neither the RRC_CONNECTED state nor the RRC_INACTIVE state, the UE 122 may be in an RRC_IDLE state.

Note that, in a case that the UE 122 is connected to the EPC, suspension of the RRC connection may be initiated by the E-UTRAN although the UE 122 does not have the RRC_INACTIVE state. In a case that the UE 122 is connected to the EPC and the RRC connection is suspended, the UE 122 may transition to the RRC_IDLE state while retaining an AS context of the UE and an identifier (resumeIdentity) used for resumption (resume). In a case that the UE 122 retains the AS context of the UE and that the E-UTRAN permits the RRC connection to be resumed and that the UE 122 needs to transition from the RRC_IDLE state to the RRC_CONNECTED state, a higher layer (for example, the NAS layer) of the RRC layer of the UE 122 may initiate the resumption of the RRC connection suspended.

The definition of the suspension may vary between the UE 122 connected to the EPC 104 and the UE 122 connected to the 5GC 110. All or some of the procedures for the UE 122 to resume from suspension may be different between a case that the UE 122 is connected to the EPC (the UE 122 is suspended in the RRC_IDLE state) and a case that the UE 122 is connected to the 5GC (the UE 122 is suspended in the RRC_INACTIVE state).

Note that the RRC_CONNECTED state, the RRC_INACTIVE state, and the RRC_IDLE state may be respectively referred to as a connected state (connected mode), an inactive state (inactive mode), and an idle state (idle mode), or may be respectively referred to as an RRC connected state (RRC connected mode), an RRC inactive state (RRC inactive mode), and an RRC idle state (RRC idle mode).

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source, a cell identity (cellIdentity), and a physical cell identity of the PCell of the connection source. Note that the AS context of the UE retained by one or all of the eNB 102 and the gNB 108 may include information identical to the information of the AS context of the UE retained by the UE 122, or may include information different from the information included in the AS context of the UE retained by the UE 122.

The security context may be information including all or some of an encryption key at the AS level, a Next Hop parameter (NH), a Next Hop Chaining Counter parameter (NCC) used to derive an access key for the next hop, an identifier of an encryption algorithm at a selected AS level, and a counter used for replay protection.

The Cell Group configured for the terminal apparatus from the base station apparatus will be described. The cell group may include one Special Cell (SpCell). The cell group may include one SpCell and one or multiple Secondary Cells (SCells). In other words, the cell group may include one SpCell, and optionally one or multiple SCells. The cell group may be expressed as a set of cells. Note that, in a case that the MAC entity is associated with a Master Cell Group (MCG), the SpCell may mean a Primary Cell (PCell). In a case that the MAC entity is associated with a Secondary Cell Group (SCG), the SpCell may mean a Primary SCG Cell (PSCell). In a case that the MAC entity is not associated with the cell group, the SpCell may mean the PCell. The PCell, the PSCell, and the SCell are each a serving cell. The SpCell may support PUCCH transmission and contention-based Random Access, and the SpCell may be constantly activated. The PCell may be a cell used for an RRC connection establishment procedure in a case that the terminal apparatus in the RRC idle state transitions to the RRC connected state. The PCell may be a cell used for an RRC connection reestablishment procedure in which the terminal apparatus performs reestablishment of RRC connection. The PCell may be a cell used for a random access procedure in a case of a handover. The PSCell may be a cell used for the random access procedure in a case of addition of a Secondary Node (SN) to be described below. The SpCell may be a cell used for purposes other than the purposes described above. Note that the cell group configured for the terminal apparatus including the SpCell and one or more SCells may be considered as carrier aggregation (CA) being configured for the terminal apparatus. For the terminal apparatus configured with CA, a cell that provides additional radio resources to the SpCell may mean the SCell.

A group of serving cells configured by the RRC, which is a cell group using the same timing reference cell and the same timing advance value for cells out of the group configured with the uplink may be referred to as a Timing Advance Group (TAG). The TAG including the SpCell of the MAC entity may mean a Primary Timing Advance Group (PTAG). The TAG other than the PTAG may mean a Secondary Timing Advance Group (STAG).

In a case that Dual Connectivity (DC), Multi-Radio Dual Connectivity (MR-DC), or the like are performed, addition of a cell group to the terminal apparatus from the base station apparatus may be performed. DC may be a technology for performing data communication by using radio resources of the cell groups configured by each of a first base station apparatus (first node) and a second base station apparatus (second node). MR-DC may be a technology included in DC. In order to perform DC, the first base station apparatus may add the second base station apparatus. The first base station apparatus may be referred to as a Master Node (MN). The cell group configured by the master node may be referred to as a Master Cell Group (MCG). The second base station apparatus may be referred to as a Secondary Node (SN). The cell group configured by the secondary node may be referred to as a Secondary Cell Group (SCG). Note that the master node and the secondary node may be configured in the same base station apparatus.

In a case that DC is not configured, the cell group configured for the terminal apparatus may be referred to as an MCG. In the case that DC is not configured, the SpCell configured for the terminal apparatus may be the PCell.

Note that MR-DC may be a technology for performing DC using E-UTRA for the MCG and NR for the SCG. MR-DC may be a technology for performing DC using NR for the MCG and E-UTRA for the SCG. MR-DC may be a technology for performing DC using NR for both the MCG and the SCG. As an example of MR-DC using E-UTRA for the MCG and NR for the SCG, there may be E-UTRA-NR Dual Connectivity (EN-DC) using the EPC as a core network, and NG-RAN E-UTRA-NR Dual Connectivity (NGEN-DC) using the 5GC as a core network. As an example of MR-DC using NR for the MCG and E-UTRA for the SCG, there may be NR-E-UTRA Dual Connectivity (NE-DC) using the 5GC as a core network. As an example of MR-DC using NR for both of the MCG and the SCG, there may be NR-NR Dual Connectivity (NR-DC) using the 5GC as a core network.

Note that, in the terminal apparatus, one MAC entity may be present for each cell group. For example, in a case that DC or MR-DC is configured for the terminal apparatus, one MAC entity may be present for the MCG, and one MAC entity may be present for the SCG. The MAC entity for the MCG in the terminal apparatus may be constantly established for the terminal apparatus in all of the states (the RRC idle state, the RRC connected state, the RRC inactive state, and the like). The MAC entity for the SCG in the terminal apparatus may be created by the terminal apparatus in a case that the SCG is configured for the terminal apparatus. Configuration of the MAC entity for each cell group of the terminal apparatus may be performed in a case that the terminal apparatus receives an RRC message from the base station apparatus. In EN-DC and NGEN-DC, the MAC entity for the MCG may be an E-UTRA MAC entity, and the MAC entity for the SCG may be an NR MAC entity. In NE-DC, the MAC entity for the MCG may be an NR MAC entity, and the MAC entity for the SCG may be an E-UTRA MAC entity. In NR-DC, the MAC entities for the MCG and the SCG may each be an NR MAC entity. Note that a case that one MAC entity is present for each cell group may be alternatively described as a case that one MAC entity is present for each SpCell. One MAC entity for each cell group may be alternatively referred to as one MAC entity for each SpCell.

The radio bearers will be described. For the SRBs of E-UTRA, SRB0 to SRB2 may be defined, or SRBs other than these may be defined. For the SRBs of NR, SRB0 to SRB3 may be defined, or SRBs other than these may be defined. SRB0 may be an SRB for an RRC message transmitted and/or received using the CCCH of the logical channel. SRB1 may be an SRB for an RRC message, and for a NAS message before establishment of SRB2. The RRC message transmitted and/or received using SRB1 may include a piggybacked NAS message. For all of RRC messages and NAS messages transmitted and/or received using SRB1, the DCCH of the logical channel may be used. SRB2 may be an SRB for a NAS message, and for an RRC message including logged measurement information. For all of RRC messages and NAS messages transmitted and/or received using SRB2, the DCCH of the logical channel may be used. SRB2 may have a priority lower than that of SRB1. SRB3 may be an SRB for transmitting and/or receiving a specific RRC message in a case that EN-DC, NGEN-DC, NR-DC, or the like is configured for the terminal apparatus. For all of RRC messages and NAS messages transmitted and/or received using SRB3, the DCCH of the logical channel may be used. Other SRBs may be provided for other purposes. The DRB may be a radio bearer for user data. For an RRC message transmitted and/or received using the DRB, the DTCH of the logical channel may be used.

The radio bearers in the terminal apparatus will be described. The radio bearers include an RLC bearer. The RLC bearer may include one or two RLC entities and a logical channel. The RLC entities in a case that the RLC bearer includes two RLC entities may be the transmitting RLC entity and the receiving RLC entity in the TM RLC entity and/or the uni-directional UM mode RLC entity. SRB0 may include one RLC bearer. The RLC bearer of SRB0 may include the RLC entity of TM, and a logical channel. SRB0 may be constantly established in the terminal apparatus in all of the states (the RRC idle state, the RRC connected state, the RRC inactive state, and the like). In a case that the terminal apparatus transitions from the RRC idle state to the RRC connected state, one SRB1 may be established and/or configured for the terminal apparatus, using an RRC message received from the base station apparatus. SRB1 may include one PDCP entity, and one or multiple RLC bearers. The RLC bearer of SRB1 may include the RLC entity of AM, and a logical channel. One SRB2 may be established and/or configured for the terminal apparatus, using an RRC message that the terminal apparatus in the RRC connected state with activated AS security receives from the base station apparatus. SRB2 may include one PDCP entity, and one or multiple RLC bearers. The RLC bearer of SRB2 may include the RLC entity of AM, and a logical channel. Note that the PDCP of SRB1 and SRB2 on the base station apparatus side may be deployed in the master node. In a case that the secondary node in EN-DC. NGEN-DC, or NR-DC is added or in a case that the secondary node is changed, one SRB3 may be established and/or configured for the terminal apparatus, using an RRC message that the terminal apparatus in the RRC connected state with activated AS security receives from the base station apparatus. SRB3 may be a direct SRB between the terminal apparatus and the secondary node. SRB3 may include one PDCP entity, and one or multiple RLC bearers. The RLC bearer of SRB3 may include the RLC entity of AM, and a logical channel. The PDCP of the SRB3 on the base station apparatus side may be deployed in the secondary node. One or multiple DRBs may be established and/or configured for the terminal apparatus, using an RRC message that the terminal apparatus in the RRC connected state with activated AS security receives from the base station apparatus. The DRB may include one PDCP entity, and one or multiple RLC bearers. The RLC bearer of the DRB may include the RLC entity of AM or UM, and a logical channel.

Note that, in MR-DC, the radio bearer whose PDCP is deployed in the master node may be referred to as an MN terminated bearer. In MR-DC, the radio bearer whose PDCP is deployed in the secondary node may be referred to as an SN terminated bearer. Note that, in MR-DC, the radio bearer whose RLC bearer is present only in the MCG may be referred to as an MCG bearer. In MR-DC, the radio bearer whose RLC bearer is present only in the SCG may be referred to as an SCG bearer. In DC, the radio bearer whose RLC bearer is present in both of the MCG and the SCG may be referred to as a split bearer.

In a case that MR-DC is configured for the terminal apparatus, a bearer type of SRB1 and SRB2 established/and or configured for the terminal apparatus may be an MN terminated MCG bearer and/or an MN terminated split bearer. In a case that MR-DC is configured for the terminal apparatus, a bearer type of SRB3 established/and or configured for the terminal apparatus may be an SN terminated SCG bearer. In a case that MR-DC is configured for the terminal apparatus, a bearer type of the DRB established/and or configured for the terminal apparatus may be any one of all of the bearer types.

The RLC entity established and/or configured for the RLC bearer established and/or configured for the cell group configured in E-UTRA may be the E-UTRA RLC. The RLC entity established and/or configured for the RLC bearer established and/or configured for the cell group configured in NR may be the NR RLC. In a case that EN-DC is configured for the terminal apparatus, the PDCP entity established and/or configured for the MN terminated MCG bearer may be either the E-UTRA PDCP or the NR PDCP. In a case that EN-DC is configured for the terminal apparatus, the PDCP established and/or configured for the radio bearers of other bearer types, i.e., an MN terminated split bearer, an MN terminated SCG bearer, an SN terminated MCG bearer, an SN terminated split bearer, and an SN terminated SCG bearer, may be the NR PDCP. In a case that NGEN-DC, NE-DC, or NR-DC is configured for the terminal apparatus, the PDCP entity established and/or configured for the radio bearers of all of the bearer types may be the NR PDCP.

Note that, in NR, the DRB established and/or configured for the terminal apparatus may be associated with one PDU session. One SDAP entity may be established and/or configured for one PDU session in the terminal apparatus. The SDAP entity, the PDCP entity, the RLC entity, and the logical channel established and/or configured for the terminal apparatus may be established and/or configured using an RRC message that the terminal apparatus receives from the base station apparatus.

Note that regardless of whether MR-DC is configured, a network configuration in which the master node is the eNB 102 and the EPC 104 is used as a core network may be referred to as E-UTRA/EPC. A network configuration in which the master node is the eNB 102 and the 5GC 110 is used as a core network may be referred to as E-UTRA/5GC. A network configuration in which the master node is the gNB 108 and the 5GC 110 is used as a core network may be referred to as NR or NR/5GC. In a case that MR-DC is not configured, the master node described above may refer to the base station apparatus that performs communication with the terminal apparatus.

Next, the handover in LTE and NR will be described. The handover may be processing in which the UE 122 in the RRC connected state changes the serving cell from a source SpCell to a target SpCell. The handover may be performed in a case that the UE 122 receives an RRC message indicating handover from the eNB 102 and/or the gNB 108. The RRC message indicating handover may be a message related to reconfiguration of RRC connection including a parameter indicating handover (for example, an information element referred to as MobilityControlInfo, or an information element referred to as Reconfiguration WithSync). Note that the information element referred to as Mobility ControlInfo described above may be alternatively referred to as a mobility control configuration information element, a mobility control configuration, or mobility control information. Note that the information element referred to as Reconfiguration WithSync described above may be alternatively referred to as a reconfiguration with synchronization information element, or a reconfiguration with synchronization. Alternatively, the RRC message indicating handover may be a message (for example, MobilityFromEUTRACommand, or Mobility FromNRCommand) indicating movement to a cell of another RAT. The handover may be alternatively referred to as a reconfiguration with synchronization (reconfiguration with sync). As a condition that the UE 122 can perform handover, a case that a part or all of a case that AS security is activated, a case that the SRB2 has been established, included may be that at least one DRB has been established.

Figure 4:
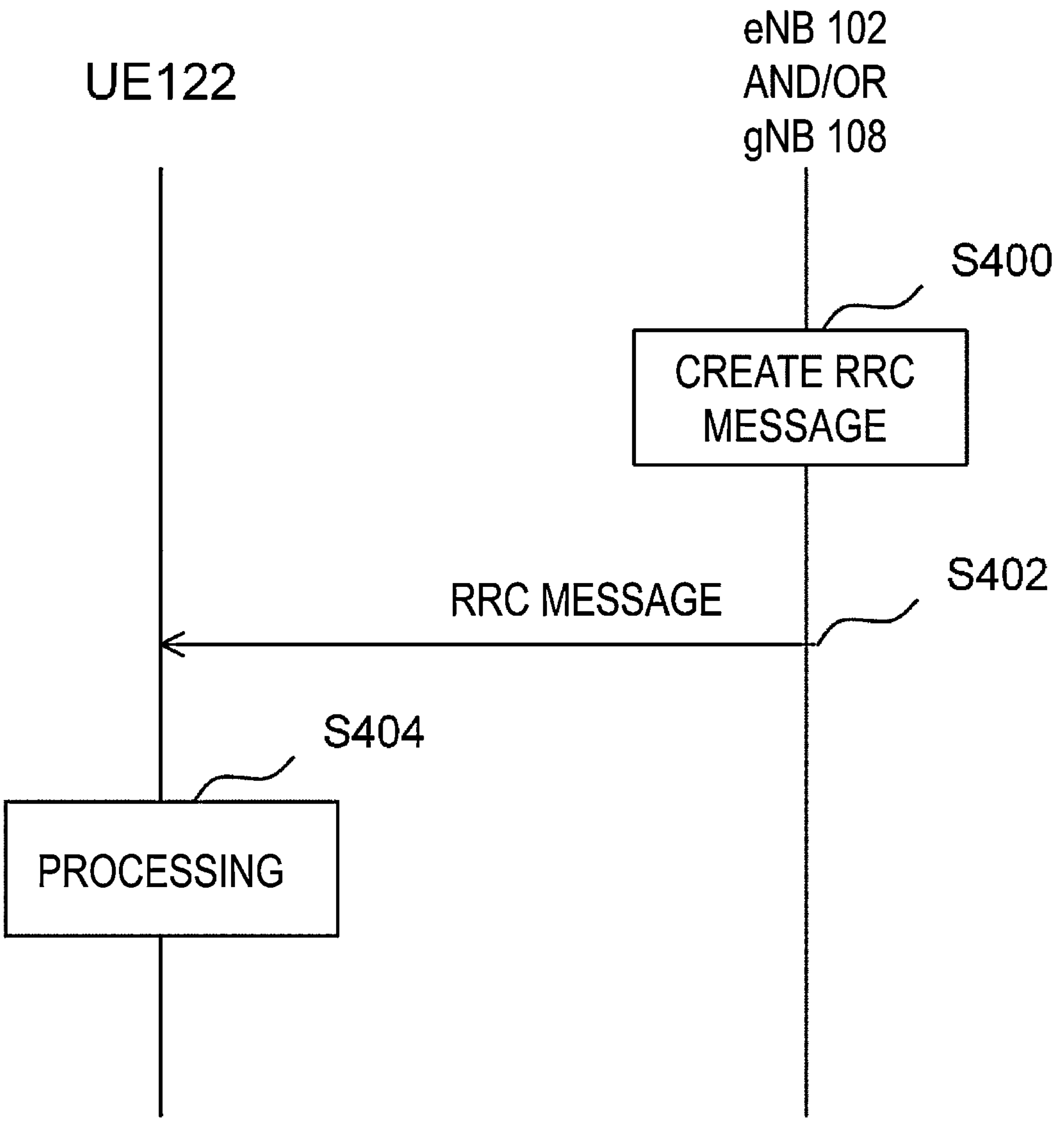
FIG. 4 is a diagram illustrating an example of a flow of a procedure for various configurations in RRC according to an embodiment of the present invention.

A flow of the RRC message transmitted and/or received between the terminal apparatus and the base station apparatus will be described. FIG. 4 is a diagram illustrating an example of a flow of a procedure for various configurations in the RRC according to an embodiment of the present invention. FIG. 4 is an example of a flow of a case in which the RRC message is transmitted from the base station apparatus (eNB 102 and/or gNB 108) to the terminal apparatus (UE 122).

In FIG. 4, the base station apparatus creates an RRC message (Step S400). The creation of the RRC message in the base station apparatus may be performed so that the base station apparatus distributes broadcast information (System Information (SI)) and paging information. The creation of the RRC message in the base station apparatus may be performed so that the base station apparatus causes a specific terminal apparatus to perform processing. The processing that the specific terminal apparatus is caused to perform may include, for example, processing such as configuration related to security, reconfiguration of RRC connection, handover to a different RAT, suspension of RRC connection, and release of RRC connection. The processing of reconfiguration of RRC connection may include, for example, processing such as control (establishment, change, release, or the like) of a radio bearer, control (establishment, addition, change, release, or the like) of a cell group, measurement configuration, handover, and security key update. The creation of the RRC message in the base station apparatus may be performed for a response to an RRC message transmitted from the terminal apparatus. The response to the RRC message transmitted from the terminal apparatus may include, for example, a response to an RRC setup request, a response to an RRC reconnection request, a response to an RRC resume request, and the like. The RRC message includes information (parameters) for various information notifications and configurations. These parameters may be referred to as fields and/or information elements, and may be notated by using a notation method referred to as Abstract Syntax Notation One (ASN.1).

In FIG. 4, the base station apparatus then transmits the RRC message created, to the terminal apparatus (Step S402). Then, in a case that processing such as a configuration is necessary in accordance with the RRC message received, the terminal apparatus performs the processing (Step S404). The terminal apparatus that has performed the processing may transmit an RRC message for a response to the base station apparatus (not illustrated).

In addition to the example described above, the RRC message may be used for other purposes as well.

Note that in MR-DC, the RRC on the master node side may be used to transfer the RRC message for the configuration (cell group configuration, radio bearer configuration, measurement configuration, and the like) on the SCG side to and from the terminal apparatus. For example, in EN-DC or NGEN-DC, the RRC message of E-UTRA transmitted and/or received between the eNB 102 and the UE 122 may include the RRC message of NR in a form of a container. In NE-DC, the RRC message of NR transmitted and/or received between the gNB 108 and the UE 122 may include the RRC message of E-UTRA in a form of a container. The RRC message for the configuration on the SCG side may be transmitted and/or received between the master node and the secondary node.

Note that an embodiment is not limited to a case that MR-DC is used, and the RRC message for E-UTRA transmitted from the eNB 102 to the UE 122 may include the RRC message for NR, and the RRC message for NR transmitted from the gNB 108 to the UE 122 may include the RRC message for E-UTRA.

An example of parameters included in the message related to reconfiguration of an RRC connection will be described. FIG. 7 is an example of an ASN.1 notation representing a field and/or an information element related to a cell group configuration included in a message related to reconfiguration of an RRC connection in NR in FIG. 4. FIG. 8 is an example of an ASN.1 notation representing a field and/or an information element related to a cell group configuration included in a message related to reconfiguration of an RRC connection in E-UTRA in FIG. 4. Not only in the figures of FIG. 7 and FIG. 8, but also in examples of the ASN.1 according to an embodiment of the present invention, <omitted> and <partly omitted> are not a part of the notation of the ASN.1 and indicate that other information is omitted at these positions. Note that there may also be omitted information elements in a part where neither <omitted> nor <partly omitted> is indicated. Note that, in an embodiment of the present invention, the examples of the ASN.1 do not correctly comply with the ASN.1 notation method. In an embodiment of the present invention, the examples of the ASN.1 are notations of examples of parameters of the RRC message according to an embodiment of the present invention, and other terms and other notations may be used. The examples of ASN.1 correspond to only examples related to main information closely associated with an aspect of the present invention in order to avoid complicated description. Note that the parameters notated in ASN.1 may all be referred to as information elements without distinction between fields, information elements, or the like. In an embodiment of the present invention, fields, information elements, and the like notated in ASN.1 included in the RRC message may be alternatively referred to as information, or may be alternatively referred to as parameters. Note that the message related to reconfiguration of RRC connection may be an RRC reconfiguration message in NR or an RRC connection reconfiguration message in E-UTRA.

Activation and deactivation of a cell will be described. In the terminal apparatus communicating in dual connectivity, the master cell group (MCG) and the secondary cell group (SCG) are configured by the message related to reconfiguration of RRC connection. Each cell group may include a special cell (SpCell) and zero or more cells (secondary cells (SCells)) other than the special cell. The SpCell of the MCG is also referred to as a PCell. The SpCell of the SCG is also referred to as a PSCell. Deactivation of a cell may not be applied to the SpCell but may be applied to the SCell.

Deactivation of a cell may not be applied to the PCell but may be applied to the PSCell. In this case, deactivation of a cell may be processing different between the SpCell and the SCell.

Activation and deactivation of a cell may be processed in the MAC entity that is present for each cell group. The SCell configured for the terminal apparatus may be activated and/or deactivated by a part or all of the following (A) to (C).

(A) reception of a MAC CE indicating activation/deactivation of the SCell;

(B) an SCell deactivation timer configured for each SCell not configured with the PUCCH.

(C) an RRC parameter (sCellState) configured for each SCell configured for the terminal apparatus Specifically, the MAC entity of the terminal apparatus may perform the following processing (AD) for each SCell configured in the cell group.

Processing AD

In a case that an RRC parameter (sCellState) configured for the SCell in a case of SCell configuration is configured to be activated or the MAC CE for activating the SCell is received, the MAC entity of the UE 122 performs processing (AD-1). Otherwise, in a case that the MAC CE for deactivating the SCell is received, or the SCell deactivation timer expires in the SCell in the activated state, the MAC entity of the UE 122 performs processing (AD-2). In a case that an uplink grant or a downlink assignment is reported on the PDCCH of the SCell in the activated state, or an uplink grant or a downlink assignment for the SCell in the activated state is reported on the PDCCH of a certain serving cell, or the MAC PDU is transmitted in a configured uplink grant, or the MAC PDU is received in a configured downlink assignment, the MAC entity of the UE 122 restarts the SCell deactivation timer associated with the SCell. In a case that the SCell enters the deactivated state, the MAC entity of the UE 122 performs processing (AD-3).

Processing AD-1

In NR, in a case that the SCell is in the deactivated state before the MAC CE for activating the SCell is received, or the RRC parameter (sCellState) configured for the SCell in a case of SCell configuration is configured to be activated, the MAC entity of the UE 122 performs processing (AD-1A) or processing (AD-1B).

The MAC entity of the UE 122 starts the SCell deactivation timer associated with the SCell, or restarts the timer (in a case that the timer has already started).

In a case that an Active DL BWP is not a Dormant BWP to be described below, the MAC entity of the UE 122 performs a part or all of the following (A) to (B):

(A) in a case that there is a stored configuration, in accordance with the stored configuration, all suspended configured uplink grants of grant type 1 associated with the SCell are (re)initialized; and (B) trigger a PHR.

In a case that the MAC CE for activating the SCell is received, and the BWP indicated by a first active downlink BWP identifier (firstActiveDownlinkBWP-Id) configured for the SCell using the RRC message is not configured as the Dormant BWP, the MAC entity of the UE 122 performs processing (AD-1A). In a case that the MAC CE for activating the SCell is received and the BWP indicated by a first active downlink BWP identifier (first ActiveDownlinkBWP-Id) configured for the SCell using the RRC message is configured as the Dormant BWP, the MAC entity of the UE 122 performs processing (AD-1B). The MAC entity of the UE 122 performs a part or all of the following (A) to (B):

(A) activate a BWP indicated by the first active downlink BWP identifier (firstActiveDownlinkBWP-Id) configured in an RRC message;

(B) activate a BWP indicated by a first active uplink BWP identifier (firstActiveUplinkBWP-Id) configured in an RRC message.

Processing AD-1A

The MAC entity of the UE 122 brings the SCell into the activated state, and applies (performs) regular SCell Operation including a part or all of the following (A) to (E):

(A) transmit a sounding reference signal (SRS) in the SCell;

(B) report channel state information (CSI) for the SCell;

(C) monitor the PDCCH in the SCell;

(D) monitor the PDCCH for the SCell (in a case that scheduling for the SCell is performed in another serving cell);

(E) perform PUCCH transmission in the SCell in a case that the PUCCH is configured.

Processing AD-1B

The MAC entity of the UE 122 stops a BWP deactivation timer of the serving cell, in a case that the BWP deactivation timer is running.

Processing AD-2

The MAC entity of the UE 122 performs a part or all of the following (A) to (F):

(A) deactivate the SCell;

(B) stop the SCell deactivation timer associated with the SCell;

(C) deactivate all activated BWPs associated with the SCell;

(D) clear all configured downlink allocations and/or all configured uplink grants of grant type 2 associated with the SCell;

(E) suspend all configured uplink grants of grant type 1 associated with the SCell; and (F) flush a HARQ buffer associated with the SCell.

Processing AD-3

The MAC entity of the UE 122 performs a part or all of the following (A) to (D):

(A) not transmit an SRS in the SCell;

(B) not report CSI for the SCell;

(C) not transmit the PUCCH, the UL-SCH, and/or the RACH in the SCell;

(D) not monitor the PDCCH for the SCell and/or the PDCCH for the SCell.

As described above, activation and deactivation of the SCell is performed by the MAC entity performing the processing (AD).

In a case that the SCell is added as described above, an initial state of the SCell may be configured by the RRC message.

Here, the SCell deactivation timer will be described. A value (information related to time at which the timer is considered to have expired) of the SCell deactivation timer may be reported, by the RRC message, to the SCell not configured with the PUCCH. For example, in a case that information indicating 40 ms as the value of the SCell deactivation timer is reported by the RRC message, in the processing (AD), the timer is considered to have expired after the elapse of time (here, 40 ms) reported without stopping of the timer since the timer is started or restarted. The SCell deactivation timer may be a timer referred to as sCellDeactivation Timer.

Here, a bandwidth part (BWP) will be described.

The BWP may be a partial band or an entire band of the serving cell. The BWP may be referred to as a Carrier BWP. The terminal apparatus may be configured with one or multiple BWPs. A certain BWP may be configured by information included in broadcast information associated with a synchronization signal detected in initial cell search. A certain BWP may be a frequency bandwidth associated with a frequency for performing the initial cell search. A certain BWP may be configured by RRC signaling (for example, Dedicated RRC signaling). A downlink BWP (DL BWP) and an uplink BWP (UL BWP) may be separately configured. One or multiple uplink BWPs may be associated with one or multiple downlink BWPs. Association between the uplink BWP and the downlink BWP may be prescribed association, may be association by RRC signaling (for example, Dedicated RRC signaling), may be association by physical layer signaling (for example, downlink control information (DCI) reported on a downlink control channel, or may be a combination of those.

The BWP may include a group of continuous Physical Resource Blocks (PRBs). For the terminal apparatus in the connected state, parameters of the BWP(s) (one or multiple BWPs) of each component carrier may be configured. As parameters of the BWP of each component carrier, a part or all of the followings: (A) a type of a cyclic prefix; (B) a subcarrier interval; (C) a frequency position of the BWP (for example, a start position or a center frequency position on a low frequency side of the BWP) (as the frequency position, for example, an ARFCN may be used, or an offset from a specific subcarrier of the serving cell may be used. The unit of the offset may be a subcarrier unit or a resource block unit. Both the ARFCN and the offset may be configured); (D) a bandwidth of the BWP (for example, the number of PRBs); (E) resource configuration information of the control signal; and (F) a center frequency position of an SS block (as the frequency position, for example, the ARFCN may be used, or the offset from a specific subcarrier of the serving cell may be used. The unit of the offset may be the subcarrier unit or the resource block unit. Both the ARFCN and the offset may be configured) may be included. The resource configuration information of a control signal may be at least included in configuration of a part or all of the BWPs of the PCell and/or the PSCell.

The terminal apparatus may perform transmission and/or reception in an active BWP (Active BWP) out of the one or multiple configured BWPs. Among one or multiple BWPs configured for one serving cell associated with the terminal apparatus, at most one uplink BWP and/or at most one downlink BWP may be configured to be the active BWP at a certain time. The activated downlink BWP is also referred to as an Active DL BWP. The activated uplink BWP is also referred to as an Active UL BWP.

Next, deactivation of the BWP will be described. In one serving cell, one or multiple BWPs may be configured. BWP switching in the serving cell is used to activate a deactivated BWP (also referred to as an Inactive BWP) and deactivate an activated BWP.

The BWP switching is controlled by the MAC entity itself for the PDCCH indicating a downlink assignment or an uplink grant, the BWP deactivation timer. RRC signaling, or initiation of a random access procedure. The Active BWP of the serving cell is indicated by the RRC or the PDCCH.

Next, the BWP deactivation timer will be described. For each activated serving cell configured with the BWP deactivation timer, the MAC entity performs the following processing (A). The BWP deactivation timer may be a timer referred to as bwp-InactivityTimer. (A) is as follows:

(A) in a case that an identifier (defaultDownlinkBWP-Id) of a default downlink BWP is configured, and the Active DL BWP is not the BWP indicated by an identifier (dormantDownlinkBWP-Id), or in a case that the identifier (defaultDownlinkBWP-Id) of the default downlink BWP is not configured, the Active DL BWP is not initialDownlinkBWP, and the Active DL BWP is not the BWP indicated by the identifier (dormantDownlinkBWP-Id), the MAC entity performs the processing of the following (B) and (D):

(B) in a case that the PDCCH addressed to a C-RNTI or a CS-RNTI indicating a downlink assignment or an uplink grant is received in the Active DL BWP, the PDCCH addressed to a C-RNTI or a CS-RNTI indicating a downlink assignment or an uplink grant for the Active DL BWP is received, the MAC PDU is transmitted in a configured uplink grant, or the MAC PDU is received in a configured downlink assignment, the MAC entity performs the processing of the following (C):

(C) in a case that the random access procedure associated with the serving cell is not being performed, or the random access procedure being performed associated with the serving cell successfully completed in response to reception of the PDCCH addressed to the C-RNTI, start or restart the BWP deactivation timer associated with the Active DL BWP;

(D) in a case that the BWP deactivation timer associated with the Active DL BWP expires, the MAC entity performs the processing of the following (E):

(E) in a case that defaultDownlinkBWP-Id is configured, perform BWP switching for the BWP indicated by defaultDownlinkBWP-Id, otherwise, perform BWP switching for initial DownlinkBWP.

In a case that the MAC entity receives the PDCCH for BWP switching and finishes switching the Active DL BWP, the MAC entity performs the processing of the following (A):

(A) in a case that the identifier (defaultDownlinkBWP-Id) of the default downlink BWP is configured, the switched Active DL BWP is not the BWP indicated by the identifier (dormantDownlinkBWP-Id), and the switched Active DL BWP is not the BWP indicated by dormantDownlinkBWP-Id, start or restart the BWP deactivation timer associated with the Active DL BWP.

Next, deactivation of the SCG will be described.

The deactivation of the SCG may mean deactivating the SCG. The deactivation of the SCG may mean that the MAC entity is associated with the SCG and deactivates a cell group corresponding to the MAC entity. Activation of the SCG may mean activating the SCG. The activation of the SCG may mean that the MAC entity is associated with the SCG and activates a cell group corresponding to the MAC entity.

In LTE and/or NR, a state in which the SCG is deactivated (a state in which the SCG is dormant) may be a state in which the terminal apparatus performs a part or all of the following (A) to (K) in the SpCell (PSCell) of the SCG: (SD-1)

(A) not transmit the SRS in the SpCell;

(B) measure the CSI for the SpCell;

(C) not report the CSI for the SpCell;

(D) not transmit the PUCCH, the UL-SCH, and/or the RACH in the SpCell;

(E) not monitor the PDCCH of the SpCell and/or the PDCCH for the SpCell;

(F) perform discontinuous reception (DRX) in the SpCell;

(G) not monitor the PDCCH of the SpCell and/or the PDCCH for the SpCell addressed to the C-RNTI, the MCS-C-RNTI, and/or the CS-RNTI indicating an uplink grant for UL-SCH transmission in the SpCell;

(H) not monitor the PDCCH of the SpCell and/or the PDCCH for the SpCell addressed to the C-RNTI, the MCS-C-RNTI, and/or the CS-RNTI indicating an uplink grant in the BWP, with the BWP being activated in the SpCell;

(I) perform Automatic Gain Control (AGC), Beam Failure Detection (BFD) including beam failure recovery, and/or Radio Link Monitoring (RLM) in the SpCell;

(J) leave suspended a part or all of the configured uplink grants of grant type 1 associated with the SpCell; and (K) maintain a timeAlignmentTimer (TAT) associated with the TAG (PTAG) containing the SpCell.

In LTE and/or NR, a state in which the SCG is activated (a state in which the SCG is not dormant) may be a state in which the terminal apparatus performs a part or all of the following (A) to (K) in the SpCell (PSCell) of the SCG: (SA-1)

(A) transmit the SRS in the SpCell;

(B) measure the CSI for the SpCell;

(C) report the CSI for the SpCell;

(D) transmit the PUCCH, the UL-SCH, and/or the RACH in the SpCell;

(E) monitor the PDCCH of the SpCell and/or the PDCCH for the SpCell;

(F) perform discontinuous reception (DRX) in the SpCell;

(G) monitor the PDCCH of the SpCell and/or the PDCCH for the SpCell addressed to the C-RNTI, the MCS-C-RNTI, and/or the CS-RNTI indicating an uplink grant for UL-SCH transmission in the SpCell;

(H) monitor the PDCCH of the SpCell and/or the PDCCH for the SpCell addressed to the C-RNTI, the MCS-C-RNTI, and/or the CS-RNTI indicating an uplink grant in the BWP, with the BWP being activated in the SpCell;

(I) perform Automatic Gain Control (AGC), Beam Failure Detection (BFD) including beam failure recovery, and/or Radio Link Monitoring (RLM) in the SpCell;

(J) maintain a part or all of the configured uplink grants of grant type 1 associated with the SpCell; and (K) maintain the timeAlignmentTimer (TAT) associated with the TAG (PTAG) containing the SpCell.

In LTE and/or NR, the terminal apparatus may determine that the SCG enters the deactivated state based on a part or all of the following (A) to (H). Note that the messages and the control elements in the following (A) to (F) may be reported from a cell group other than the SCG to the terminal apparatus.

(SD-2)

(A) reception of an RRC message indicating the deactivation of the SCG;

(B) reception of a MAC control element indicating the deactivation of the SCG;

(C) reception of an RRC message indicating the deactivation of the SpCell;

(D) reception of a MAC control element indicating the deactivation of the SpCell;

(E) reception of another RRC message;

(F) reception of another MAC control element;

(G) expiry of a deactivation timer of the SCG; and (H) expiry of a deactivation timer of the PSCell.

Figure 11:
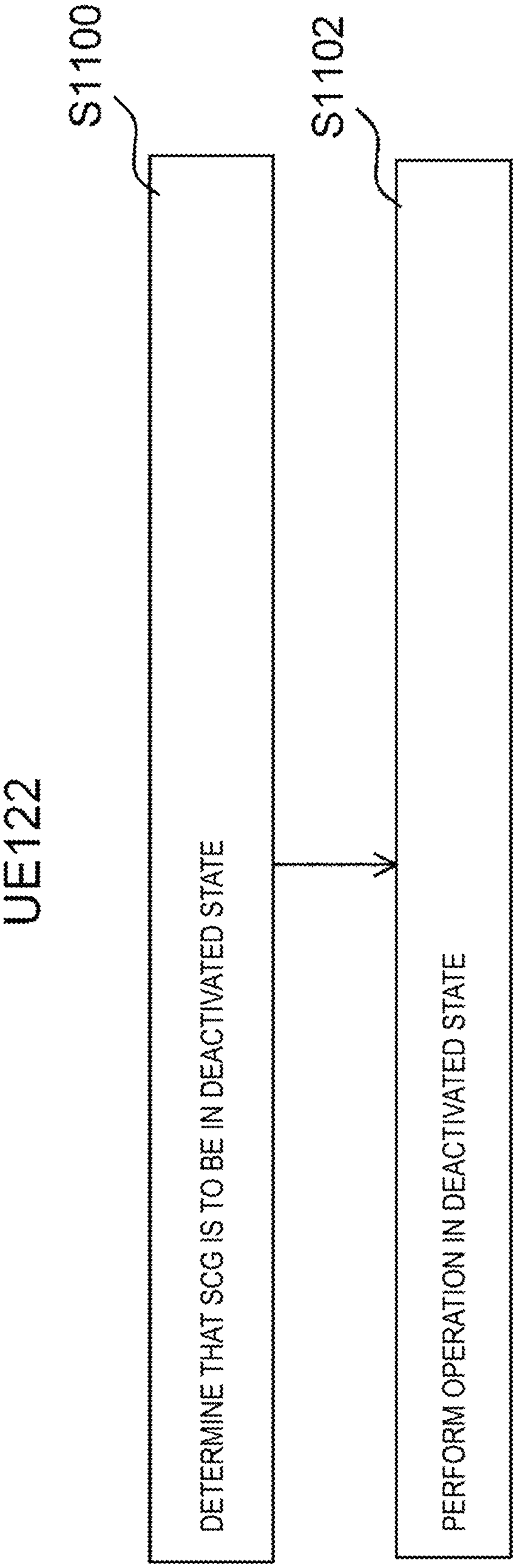
FIG. 11 is an example of processing related to deactivation of the SCG according to an embodiment of the present invention.

FIG. 11 is a diagram illustrating an example of an embodiment. In FIG. 11, a processing unit 502 of the UE 122 determines that the SCG enters the deactivated state based on the above (SD-2) (Step S1100). The processing unit 502 of the UE 122 performs operation in the deactivated state based on the determination (Step S1102).

In LTE and/or NR, the terminal apparatus may determine that the SCG does not enter the deactivated state based on a part or all of the following (A) to (K). Note that the messages and the control elements in the following (A) to (F) may be reported from a cell group other than the SCG to the terminal apparatus. That the SCG does not enter the deactivated state may be that the SCG enters the activated state.

(SA-2)

(A) reception of an RRC message indicating activation of the SCG;

(B) reception of a MAC control element indicating activation of the SCG;

(C) reception of an RRC message indicating activation of the SpCell;

(D) reception of a MAC control element indicating activation of the SpCell;

(E) reception of another RRC message;

(F) reception of another MAC control element;

(G) a deactivation timer of the SCG;

(H) a deactivation timer of the PSCell;

(I) initiation of a random access procedure due to a scheduling request triggered for transmitting the MAC PDU including the MAC SDU;

(J) initiation of a random access procedure;

(K) initiation of a random access procedure due to a scheduling request (i.e., initiated by the MAC entity itself).

Figure 10:
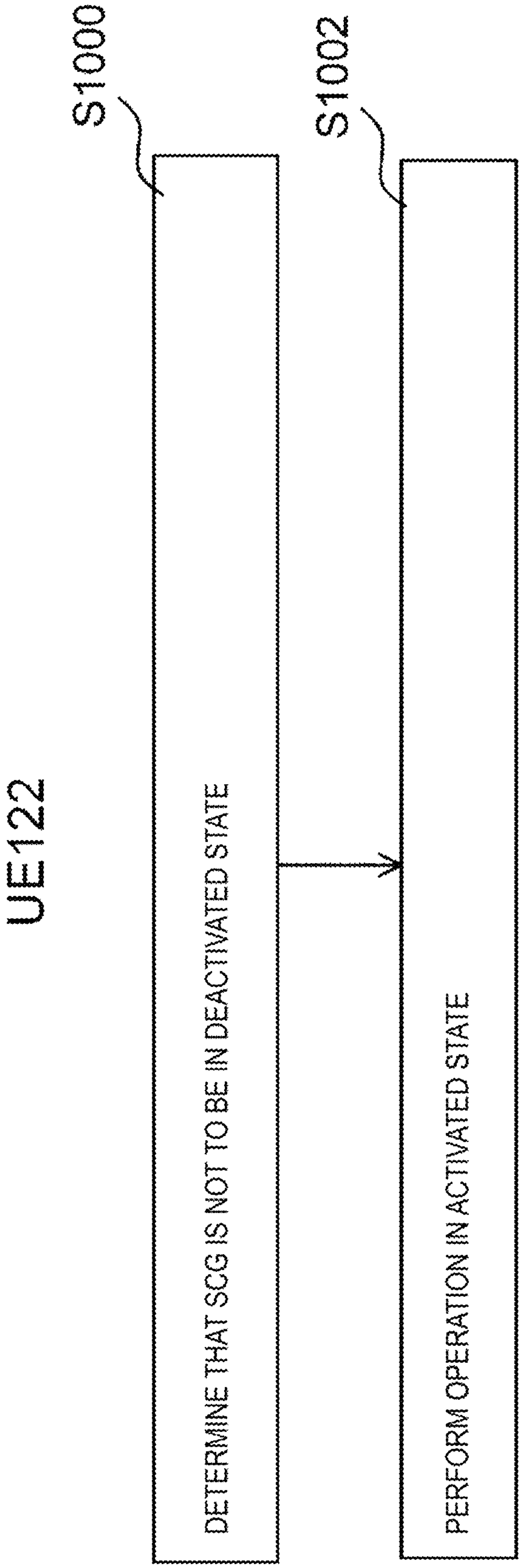
FIG. 10 is an example of processing related to activation of the SCG according to an embodiment of the present invention.

FIG. 10 is a diagram illustrating an example of an embodiment. In FIG. 10, the processing unit 502 of the UE 122 determines that the SCG does not enter the deactivated state based on the above (SA-2) (Step S1000). The processing unit 502 of the UE 122 performs operation in the activated state based on the determination (Step S1002).

The terminal apparatus that performs the deactivation of the SCG may perform a part or all of the processing of the following (A) to (F) in the SCG:

(SD-3)

(A) cause all of the SCells to be in the deactivated state;

(B) consider that all of the SCell deactivation timers associated with the SCells in the activated state have expired;

(C) consider that all of the SCell deactivation timers associated with the SCells in the dormant state have expired;

(D) not start or restart any of the SCell deactivation timers associated with the SCells;

(E) ignore the MAC CE for activating the SCells. For example, in the processing (AD), perform processing (AD-1) in a case that the MAC CE for activating the SCell is received and the deactivation of the SCG is not indicated (or the SCG is not in the deactivated state).

(F) perform the processing (AD-2). For example, in the processing (AD), perform the processing (AD-2) in a case that the deactivation of the SCG is indicated (or the SCG enters the deactivated state).

The terminal apparatus that performs the activation of the SCG may perform the following processing (A) and/or (B) in the SCG.

(SA-3)

(A) perform processing (AD-1) to cause all of the SCells to be in the activated state;

(B) In a case that the activation of the SCG is performed based on the RRC message, and a parameter related to random access to the SpCell (PSCell) is included in the RRC message, the random access procedure is initiated in the SpCell based on a reported parameter.

Figure 9:
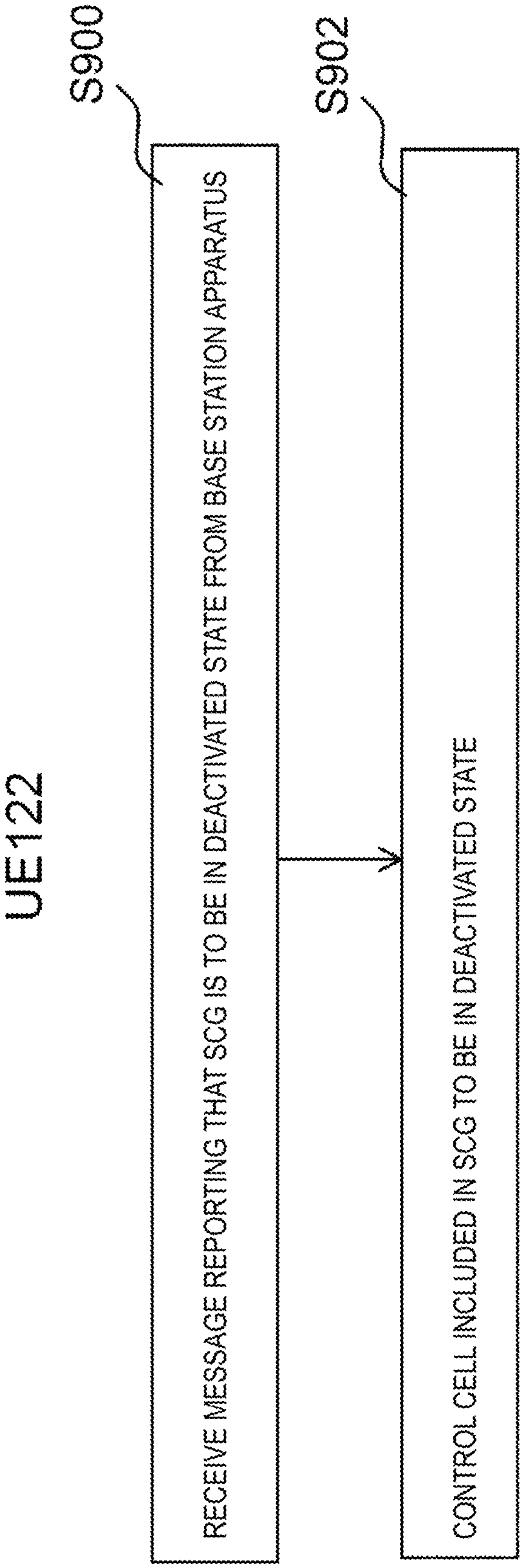
FIG. 9 is an example of processing related to deactivation of an SCG according to an embodiment of the present invention.

FIG. 9 is a diagram illustrating an example of an embodiment. In FIG. 9, the UE 122 receives a message (an RRC message) for reporting that the SCG is to be brought into the deactivated state (dormant state) from the eNB 102 or the gNB 108 (Step S900). The UE 122 controls some or all of cells of the SCG to be in the deactivated state based on the report (Step S902).

With the above operation, in the processing of deactivating the SCG, efficient state change can be performed without a transmitter 504 of the UE 122 independently transmitting the MAC CE for changing the state of the SCG cell to the deactivated state. In a case that the deactivation of the SCG is performed based on the RRC message, configuration of the initial state has been performed in the RRC layer and the state change has been performed in the MAC layer in the past, however, with the above operation, the state change of the SCG can be efficiently performed while avoiding a mismatch between an indication from the RRC layer and an indication from the MAC layer.

Next, radio link monitoring (RLM) will be described.

In the serving cell (for example, the PCell and/or the PSCell), the terminal apparatus may perform radio link monitoring by using a certain type of reference signal (for example, a cell specific reference signal (CRS)). The terminal apparatus may receive configuration (radio link monitoring configuration (RadioLinkMonitoringConfig)) indicating which reference signal is used for radio link monitoring in the serving cell (for example, the PCell and/or the PSCell) from the base station apparatus, and perform radio link monitoring by using one or multiple reference signals configured (here, referred to as an RLM-RS). The terminal apparatus may perform radio link monitoring by using another signal. The physical layer processing unit of the terminal apparatus may notify a higher layer of in synchronization in a case that a condition of in synchronization is satisfied in the serving cell (for example, the PCell and/or the PSCell).

In the radio link monitoring configuration, information indicating a purpose of monitoring and identifier information indicating a reference signal may be included. For example, the purpose of monitoring may include a purpose of monitoring a radio link failure, a purpose of monitoring a failure of a beam, both of the above purposes, or the like. For example, in the identifier information indicating a reference signal, information indicating an identifier (SSB- Index) of a Synchronization Signal Block (SSB) of a cell may be included. Specifically, in the reference signal, a synchronization signal may be included. For example, in the identifier information indicating a reference signal, information indicating an identifier associated with a channel state information reference signal (CSI-RS) configured for the terminal apparatus may be included.

In SpCells (the PCell in the MCG and the PSCell in the SCG), in a case that an RRC layer processing unit of the terminal apparatus receives out-of-synchronization reported from the physical layer processing unit consecutively a prescribed number of times (N310 times) in each SpCell, the RRC layer processing unit may start or restart a timer (T310) of the SpCell. In a case that the RRC layer processing unit of the terminal apparatus receives in synchronization consecutively a prescribed number of times (N311 times) in each SpCell, the RRC layer processing unit may stop the timer (T310) of the SpCell. In a case that the timer (T310) of each SpCell expires and the SpCell is the PCell, the RRC layer processing unit of the terminal apparatus may perform transition to an idle state or a re-establishment procedure of RRC connection. In a case that the SpCell is the PSCell, the SCG failure information procedure for notifying a network of an SCG failure may be performed.

Next, beam failure detection (BFD) will be described.

In the MAC entity, a beam failure recovery procedure may be configured for each serving cell by the RRC. The beam failure is detected by counting a beam failure instance report reported from a lower layer (PHY layer) to the MAC entity. The MAC entity may perform a part or all of the processing of the following (A), (B), and (C) in each serving cell for beam failure detection:

(A) in a case that the beam failure instance report is received from a lower layer, start or restart the timer (beamFailureDetectionTimer) and increment a counter (BFI-COUNTER) by 1. In a case that a value of BFI_COUNTER is equal to or larger than a configured threshold (beamFailureInstanceMaxCount), perform the processing of the following (A-1):

(A-1) in a case that the serving cell is the SCell, trigger a beam failure recovery (BFR) for the serving cell, otherwise, initiate the random access procedure in the SpCell.

(B) in a case that beamFailureDetectionTimer for the serving cell expires, or a configuration of beamFailureDetectionTimer, beamFailureInstanceMaxCount, and/or a reference signal for beam failure detection is changed by a higher layer, configure BFI_COUNTER to 0;

(C) in a case that the serving cell is the SpCell, and the random access procedure successfully completed, configure BFI_COUNTER to 0, stop the timer (beamFailureRecovery Timer), and consider that the beam failure recovery procedure successfully completed. Otherwise, that is, in a case that the serving cell is the SCell, the PDCCH addressed to the C-RNTI indicating a new uplink grant for transmitting information for the beam failure recovery of the SCell (for example, information included in an SCell BFR MAC CE) is received, or the SCell is in the deactivated state, configure BFI_COUNTER to 0, consider that the beam failure recovery procedure successfully completed, and cancel all of the beam failure recoveries (BFRs) triggered for the serving cell.

In a case that at least one beam failure recovery (BFR) is triggered by the beam failure recovery procedure, and it is not cancelled, the MAC entity performs the processing of the following (A):

(A) in a case that the UL-SCH resource can include a BFR MAC CE of the SCell and its subheader with priority of logical channels being taken into consideration, include the BFR MAC CE of the SCell and its subheader. Otherwise, that is, in a case that the UL-SCH resource can include a truncated BFR MAC CE of the SCell and its subheader with priority of logical channels being taken into consideration, include the truncated BFR MAC CE of the SCell and its subheader. Otherwise, trigger a scheduling request for an SCell beam failure recovery.

Based on the description in the above, various embodiments of the present invention will be described. Note that the processing described in the above may be applied to each processing not described in the following.

Figure 5:
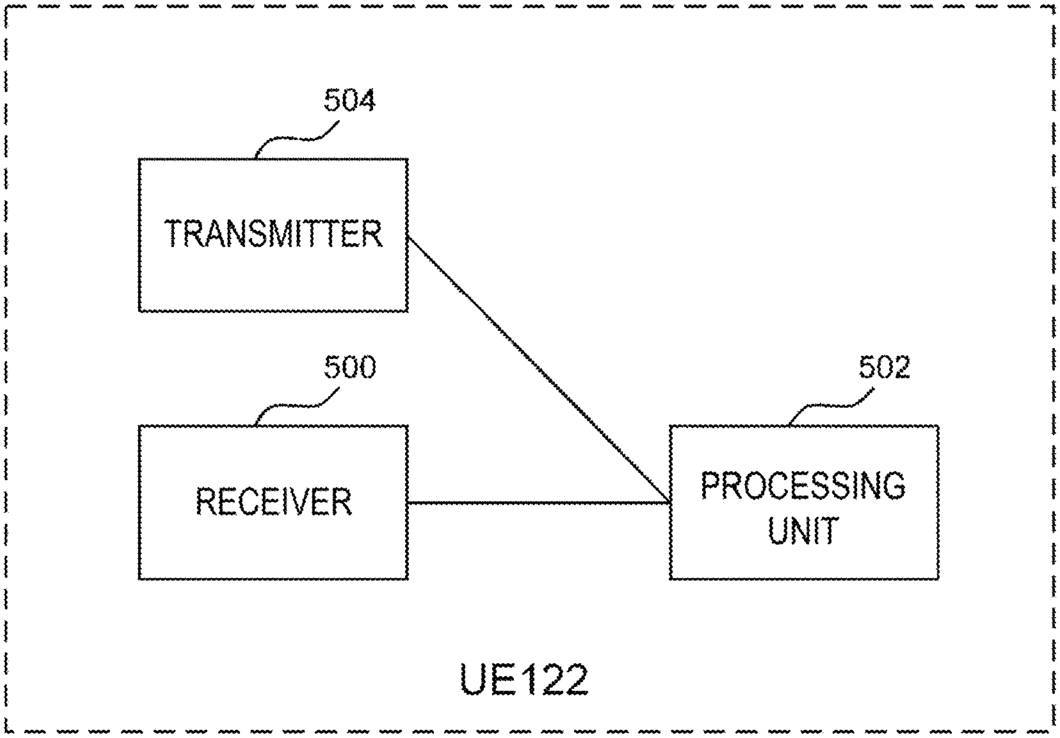
FIG. 5 is a block diagram illustrating a configuration of a terminal apparatus according to an embodiment of the present invention.

FIG. 5 is a block diagram illustrating a configuration of the terminal apparatus (UE 122) according to an embodiment of the present invention. Note that FIG. 5 illustrates only the main components closely related to an aspect of the present invention in order to avoid complexity of description.

The UE 122 illustrated in FIG. 5 includes a receiver 500 that receives the RRC message and the like from the base station apparatus, the processing unit 502 that performs processing in accordance with parameters included in a received message, and the transmitter 504 that transmits an RRC message and the like to the base station apparatus. The base station apparatus may be the eNB 102, or may be the gNB 108. The processing unit 502 may include a part or all of functions of various layers (for example, the physical layer, the MAC layer, the RLC layer, the PDCP layer, the SDAP layer, the RRC layer, and the NAS layer). In other words, the processing unit 502 may include a part or all of a physical layer processing unit, a MAC layer processing unit, an RLC layer processing unit, a PDCP layer processing unit, an SDAP processing unit, an RRC layer processing unit, and a NAS layer processing unit.

Figure 6:
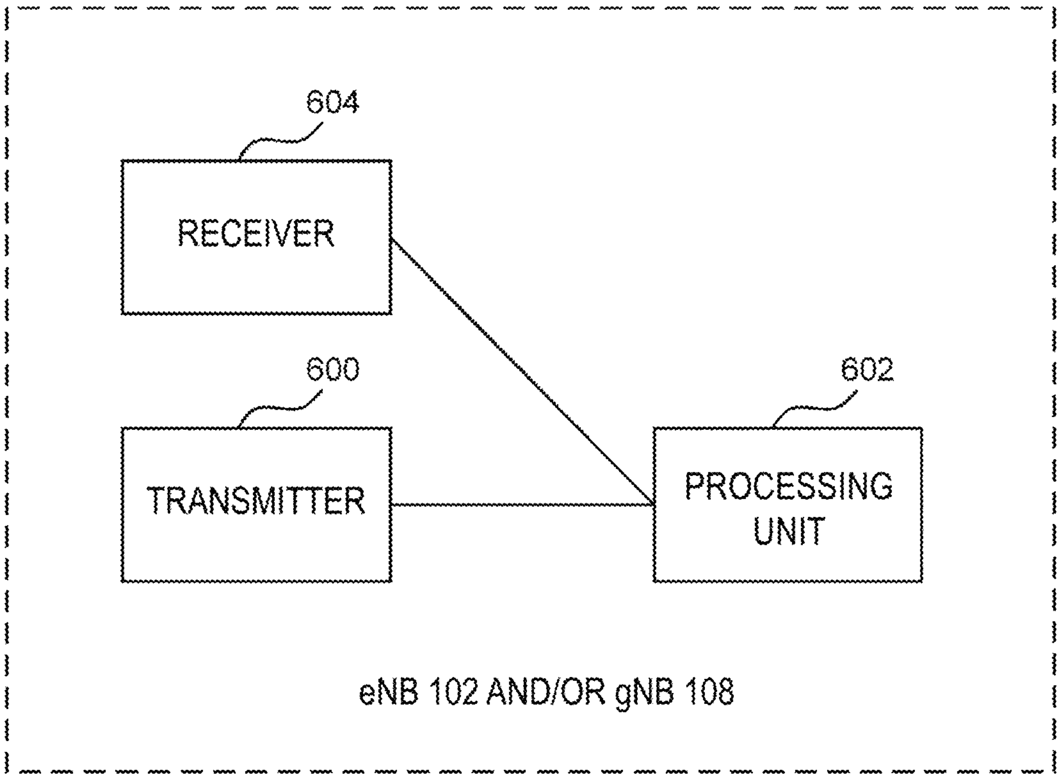
FIG. 6 is a block diagram illustrating a configuration of a base station apparatus according to an embodiment of the present invention.

FIG. 6 is a block diagram illustrating a configuration of the base station apparatus according to an embodiment of the present invention. Note that FIG. 6 illustrates only the main components closely related to an aspect of the present invention in order to avoid complexity of description. The base station apparatus may be the eNB 102, or may be the gNB 108.

The base station apparatus illustrated in FIG. 6 includes a transmitter 600 that transmits an RRC message and the like to the UE 122, a processing unit 602 that creates an RRC message including parameters and transmits the RRC message to the UE 122 to thereby cause the processing unit 502 of the UE 122 to perform processing, and a receiver 604 that receives an RRC message and the like from the UE 122. The processing unit 602 may include a part or all of functions of various layers (for example, the physical layer, the MAC layer, the RLC layer, the PDCP layer, the SDAP layer, the RRC layer, and the NAS layer). In other words, the processing unit 602 may include a part or all of a physical layer processing unit, a MAC layer processing unit, an RLC layer processing unit, a PDCP layer processing unit, an SDAP processing unit, an RRC layer processing unit, and a NAS layer processing unit.

With reference to FIG. 10, an example of processing of the terminal apparatus according to an embodiment of the present invention will be described. By the processing of the terminal apparatus of the embodiment of the present invention described with reference to FIG. 10, for example, an effect is expected that the terminal apparatus can reduce power consumption.

FIG. 10 is a diagram illustrating an example of processing of the terminal apparatus according to an embodiment of the present invention. The processing unit 502 of the UE 122 may determine that the SCG does not enter the deactivated state based on the above (SA-2) (Step S1000). The processing unit 502 of the UE 122 may perform operation in the activated state based on the determination (Step S1002).

An example of operation of the UE 122 in the activated state will be described. In the activated state, the UE 122 may perform a part or all of the processing described in the above (SA-1) in the SpCell and/or each of one or more SCells of a certain cell group.

The activated state may be a state in which the SCG is activated. The activated state may be a state in which the SCG has resumed from the dormant state. The activated state may be a state in which the SCG is not in the dormant state. The activated state may be a state transitioned from the deactivated state in a case that the random access procedure due to a scheduling request triggered for transmitting the MAC PDU including the MAC SDU is initiated. The activated state may be a state transitioned from the deactivated state in a case that resumption from the dormant state is indicated from the RRC entity.

In Step S1000, in a case that transition of the SCG from the deactivated state to the activated state completes, the processing unit 502 of the UE 122 may determine the transition. The processing unit 502 of the UE 122 may determine the transition during the processing in which the SCG transitions from the deactivated state to the activated state.

In a case that the UE 122 receives information for activating the SCG, the UE 122 may transition the SCG from the deactivated state to the activated state (i.e., may activate the SCG). In a case that the UE 122 receives information for indicating resumption (Resume) from the dormant state of the SCG, the UE 122 may transition the SCG from the deactivated state to the activated state. In a case that the UE 122 receives information for indicating resumption from the dormant state of the SpCell, the UE 122 may transition the SCG from the deactivated state to the activated state. In a case that the UE 122 receives other information, the UE 122 may transition the SCG from the deactivated state to the activated state. Based on the timer related to the dormancy of the SCG, the UE 122 may transition the SCG from the deactivated state to the activated state. Based on the timer related to the dormancy of the PSCell, the UE 122 may transition the SCG from the deactivated state to the activated state. In a case that the UE 122 initiates the random access procedure due to a scheduling request triggered for transmitting the MAC PDU including the MAC SDU, the UE 122 may transition the SCG from the deactivated state to the activated state. In a case that the UE 122 initiates the random access procedure, the UE 122 may transition the SCG from the deactivated state to the activated state. In a case that the UE 122 initiates the random access procedure due to a scheduling request (i.e., initiated by the MAC entity itself), the UE 122 may transition the SCG from the deactivated state to the activated state. The MAC entity of the UE 122 may acquire, from the RRC entity of the UE 122, an indication for activating the SCG, an indication of resumption from the dormant SCG, an indication of resumption from the dormant state of the SpCell, and/or other information. After the MAC entity acquires the information from the RRC entity, as described in the above (SA-2), the UE 122 may determine that the SCG does not enter the deactivated state, to transition the SCG from the deactivated state to the activated state. In a case of transitioning the SCG from the deactivated state to the activated state, the UE 122 may perform the processing described in the above (SA-3).

With reference to FIG. 11, an example of processing of the terminal apparatus according to an embodiment of the present invention will be described.

FIG. 11 is a diagram illustrating an example of processing of the terminal apparatus according to an embodiment of the present invention. The processing unit 502 of the UE 122 may determine that the SCG enters the deactivated state based on the above (SD-2) (Step S1100). The processing unit 502 of the UE 122 may perform operation in the deactivated state based on the determination (Step S1102).

An example of operation of the UE 122 in the deactivated state will be described. In the deactivated state, the UE 122 may perform a part or all of the processing described in the above (SD-1) in the SpCell and/or one or more SCells of a certain cell group.

The deactivated state may be a state in which the SCG is deactivated. The deactivated state may be entering to the dormant SCG. The deactivated state may be the dormant state of the SCG. The deactivated state may be a state in which the Active BWP of the SpCell and/or one or more SCells of the SCG is the dormant BWP. The deactivated state may be a state transitioned from the activated state in a case that the random access procedure due to a scheduling request triggered for transmitting the MAC PDU including the MAC SDU is initiated. The deactivated state may be a state transitioned from the activated state in a case that entering to the dormant state is indicated from the RRC entity.

In Step S1100, in a case that transition of the SCG from the activated state to the deactivated state completes, the processing unit 502 of the UE 122 may determine the transition. The processing unit 502 of the UE 122 may determine the transition during the processing in which the SCG transitions from the activated state to the deactivated state.

In a case that the UE 122 receives information indicating the deactivation of the SCG, the UE 122 may transition the SCG from the activated state to the deactivated state. In a case that the UE 122 receives information for indicating entering to the dormant SCG, the UE 122 may transition the SCG from the activated state to the deactivated state. In a case that the UE 122 receives information for indicating the dormancy of the SpCell, the UE 122 may transition the SCG from the activated state to the deactivated state. In a case that the UE 122 receives other information, the UE 122 may transition the SCG from the activated state to the deactivated state. In a case that the timer related to the dormancy of the SCG expires, the UE 122 may transition the SCG from the activated state to the deactivated state. In a case that the timer related to the dormancy of the PSCell expires, the UE 122 may transition the SCG from the activated state to the deactivated state. The MAC entity of the UE 122 may acquire, from the RRC entity of the UE 122, an indication for deactivating the SCG, an indication of entering to the dormant SCG, an indication of the dormancy of the SpCell, and/or other information. After the MAC entity acquires the information from the RRC entity, as described in the above (SD-2), the UE 122 may determine that the SCG enters the deactivated state, to transition the SCG from the activated state to the deactivated state. In a case of transitioning the SCG from the activated state to the deactivated state, the UE 122 may perform the processing described in the above (SD-3).

Figure 12:
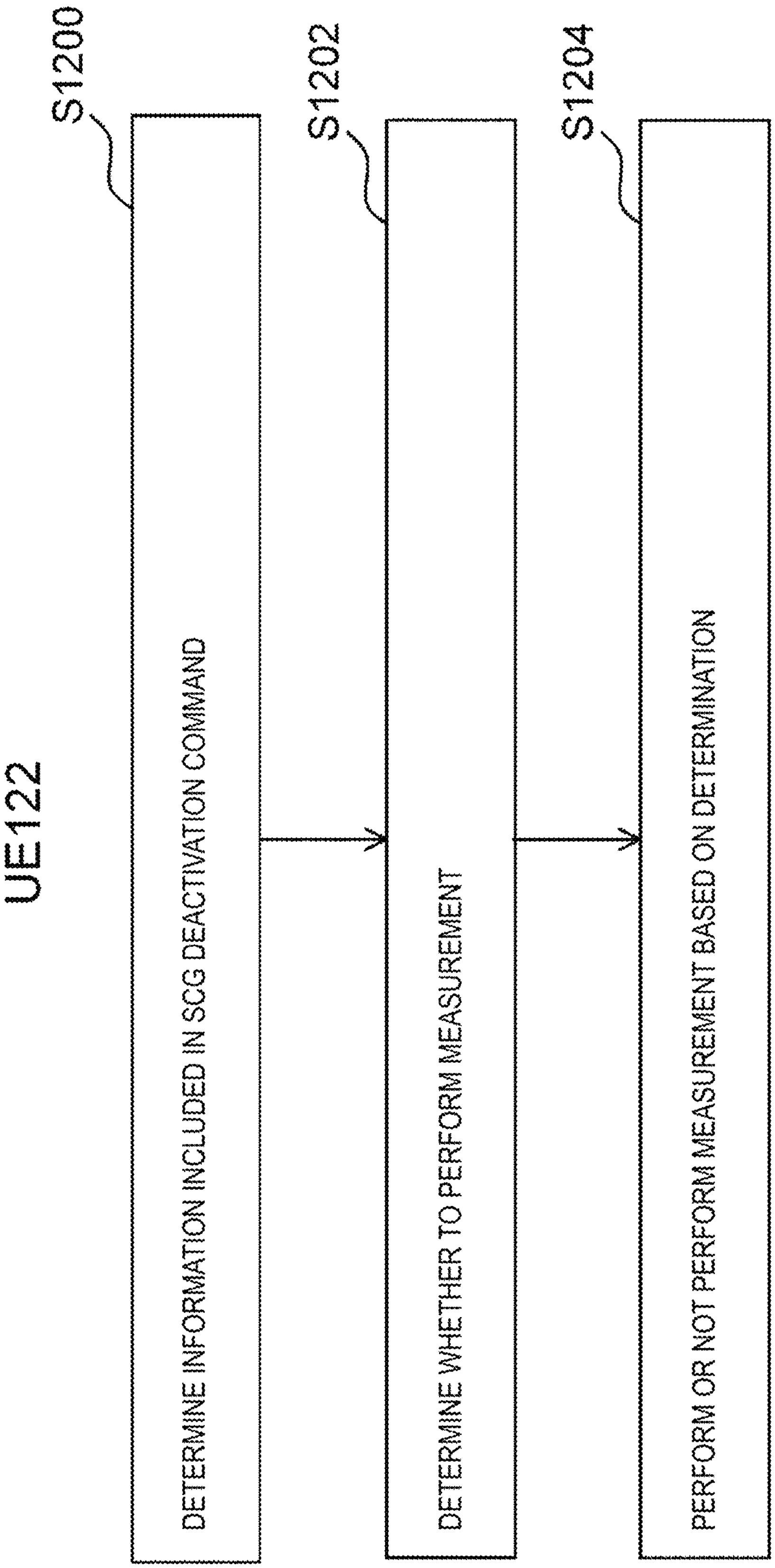
FIG. 12 is an example of processing related to measurement according to an embodiment of the present invention.

With reference to FIG. 12, an example of processing of the terminal apparatus according to an embodiment of the present invention will be described. By the processing of the terminal apparatus of the embodiment of the present invention described with reference to FIG. 12, for example, the effect is expected that the terminal apparatus can reduce power consumption.

FIG. 12 is a diagram illustrating an example of processing of the terminal apparatus according to an embodiment of the present invention. In FIG. 12, for example, the information may be information indicating that radio link monitoring is not performed. At this time, the processing unit 502 of the UE 122 brings the SCG into the deactivated state in accordance with an SCG deactivation command including the information indicating that radio link monitoring is not performed on the PSCell, determines not to perform radio link monitoring on the PSCell (Step S1202) based on that the information indicating that radio link monitoring is not performed on the PSCell is included in the SCG deactivation command (Step S1200), and does not perform radio link monitoring in the deactivated state of the SCG (Step S1204).

In a case that the information indicating that radio link monitoring is not performed on the PSCell is not included in the SCG deactivation command, the processing unit 502 may bring the SCG into the deactivated state, determine to perform radio link monitoring on the PSCell (Step S1202) based on that the information indicating that radio link monitoring is not performed on the PSCell is not included in the SCG deactivation command (Step S1200), and may perform radio link monitoring in the deactivated state of the SCG (Step S1204).

As another method, in FIG. 12, for example, the information may be information indicating that radio link monitoring is performed. At this time, the processing unit 502 of the UE 122 brings the SCG into the deactivated state in accordance with an SCG deactivation command including the information indicating that radio link monitoring is performed on the PSCell, determines to perform radio link monitoring on the PSCell (Step S1202) based on that the information indicating that radio link monitoring is performed on the PSCell is included in the SCG deactivation command (Step S1200), and performs radio link monitoring in the deactivated state of the SCG (Step S1204).

In a case that the information indicating that radio link monitoring is performed on the PSCell is not included in the SCG deactivation command, the processing unit 502 may bring the SCG into the deactivated state, determine not to perform radio link monitoring on the PSCell (Step S1202) based on that the information indicating that radio link monitoring is performed on the PSCell is not included in the SCG deactivation command (Step S1200), and not perform radio link monitoring in the deactivated state of the SCG (Step S1204). These methods may be combined. For example, the SCG deactivation command may include information indicating whether to perform radio link monitoring on the PSCell, and the processing unit 502 of the UE 122 may determine whether to perform radio link monitoring on the PSCell (Step S1202) in accordance with the information indicating whether to perform radio link monitoring on the PSCell (Step S1200).

In a case that the processing unit 502 does not perform radio link monitoring on the PSCell in the deactivated state of the SCG and receives the SCG activation command, the processing unit 502 may bring the SCG into the activated state in accordance with the SCG activation command and initiate (or resume) radio link monitoring on the PSCell. Note that the order is not limited to the above order, and the SCG may be deactivated after radio link monitoring is stopped, or the SCG may be activated after radio link monitoring is resumed.

The deactivation command may be transmitted from the base station apparatus to the UE 122 by the RRC message or may be transmitted by another method.

In FIG. 12, for example, the information may be information indicating that beam failure detection is not performed. At this time, the processing unit 502 of the UE 122 brings the SCG into the deactivated state in accordance with an SCG deactivation command including the information indicating that beam failure detection is not performed on the PSCell, determines not to perform beam failure detection on the PSCell (Step S1202) based on that the information indicating that beam failure detection is not performed on the PSCell is included in the SCG deactivation command (Step S1200), and indicates to the MAC entity of the SCG of the UE 122 not to perform beam failure detection in the deactivated state of the SCG.

In a case that the information indicating that beam failure detection is not performed on the PSCell is not included in the SCG deactivation command, the processing unit 502 brings the SCG into the deactivated state, determines to perform beam failure detection on the PSCell (Step S1202) based on that the information indicating that beam failure detection is not performed on the PSCell is not included in the SCG deactivation command (Step S1200), and in a case of being configured to perform beam failure detection, the processing unit 502 indicates to the MAC entity that beam failure detection may be performed in the deactivated state of the SCG.

As another method, in FIG. 12, for example, the information may be information indicating that beam failure detection is performed. At this time, the processing unit 502 of the UE 122 brings the SCG into the deactivated state in accordance with an SCG deactivation command including the information indicating that beam failure detection is performed on the PSCell, determines to perform beam failure detection on the PSCell (Step S1202) based on that the information indicating that beam failure detection is performed on the PSCell is included in the SCG deactivation command (Step S1200), and in a case of being configured to perform beam failure detection, the processing unit 502 indicates to the MAC entity to perform beam failure detection in the deactivated state of the SCG.

In a case that the information indicating that beam failure detection is performed on the PSCell is not included in the SCG deactivation command, the processing unit 502 brings the SCG into the deactivated state, determines not to perform beam failure detection on the PSCell (Step S1202) based on that the information indicating that beam failure detection is performed on the PSCell is not included in the SCG deactivation command (Step S1200), and indicates to the MAC entity that beam failure detection need not be performed in the deactivated state of the SCG.

The methods described above may be combined. For example, the SCG deactivation command may include information indicating whether to perform beam failure detection on the PSCell, and the processing unit 502 of the UE 122 may determine whether to perform beam failure detection on the PSCell (Step S1202) in accordance with the information indicating whether to perform beam failure detection on the PSCell (Step S1200).

In the UE 122, an indication of whether to perform beam failure detection on the PSCell to the MAC entity may be included in the SCG deactivation indication to the MAC entity. Alternatively, in the UE 122, information enabling the MAC entity to determine whether to perform beam failure detection on the PSCell to the MAC entity may be included in the SCG deactivation indication to the MAC entity.

In a case that the processing unit 502 does not perform beam failure detection on the PSCell in the deactivated state of the SCG and receives the SCG activation command, the processing unit 502 may bring the SCG into the activated state in accordance with the SCG activation command and indicate to the MAC entity to initiate (resume) beam failure detection on the PSCell.

Note that the order is not limited to the above order, and the SCG may be deactivated after beam failure detection is stopped, or the SCG may be activated after the beam failure detection is resumed.

The deactivation command may be transmitted from the base station apparatus to the UE 122 by the RRC message or may be transmitted by another method.

In this way, in the embodiment of the present invention, in a case that it is not necessary to perform radio link monitoring and beam failure detection in the deactivated state of the SCG, it is possible not to perform radio link monitoring and beam failure detection. In the case that it is not necessary to perform radio link monitoring and beam failure detection in the deactivated state of the SCG, it is possible to save power by not performing radio link monitoring and beam failure detection.

The radio bearer(s) in the above description may be the DRB, may be the SRB, or may be the DRB and the SRB.

In the above description, expressions such as "link", "map", and "associate" may be replaced with each other.

In the above description, expressions such as "included", "being included", and "was included" may be replaced with each other.

In the above description, "the" may be replaced with "above-described".

In the above description, the "SpCell of the SCG" may be replaced with the "PSCell".

In the above description, expressions such as "determined that", "configured with", and "including" may be replaced with each other.

In the above description, the "dormant state" may be replaced with the "deactivated state", and the "state resumed from the dormant state" may be replaced with the "activated state". In the above description, "activate" and "deactivate" may be replaced with the "activated state" and the "deactivated state", respectively.

In the above description, "transition from X to Y" may be replaced with "change from X to Y". In the above description, "transition" may be replaced with "determine transition of". The "activated BWP" may be replaced with the "Active BWP".

In the example of each processing or the example of the flow of each processing in the above description, a part or all of the steps need not be performed. In the example of each processing or the example of the flow of each processing in the above description, order of the steps may be different from each other. In the example of each processing or the example of the flow of each processing in the above description, a part or all of the processing in each step need not be performed. In the example of each processing or the example of the flow of each processing in the above description, order of processing in each step may be different from each other. In the above description, "to perform B based on satisfaction of A" may be replaced with "to perform B". In other words, "to perform B" may be performed independently of "satisfaction of A".

Note that in the above description. "A may be interpreted as B" may include the meaning that B is interpreted as A in addition to interpretation of A as B. In a case that the above description contains "C may be D" and "C may be E," this means inclusion of "D may be E." In a case that the above description contains "F may be G" and "G may be H," this means inclusion of "F may be H."

In the above description, in a case that a condition "A" and a condition "B" are conflicting conditions, the condition "B" may be expressed as "other" condition of the condition "A".

Various aspects of the terminal apparatus according to embodiments of the present invention will be described below.

(1) A first embodiment of the present invention is a terminal apparatus that communicates with a base station apparatus, the terminal apparatus including: a processing unit configured to perform communication using an MCG and an SCG; and a receiver configured to receive an SCG deactivation command from the base station apparatus and receive an SCG activation command from the base station apparatus, in which the MCG includes at least a PCell, the SCG includes at least a PSCell, the processing unit deactivates the SCG in a case of receiving the SCG deactivation command, the processing unit determines not to perform radio link monitoring on the PSCell in a deactivated state of the SCG in accordance with the fact that the deactivation command includes information indicating that radio link monitoring is not performed, the processing unit does not perform radio link monitoring on the PSCell in the deactivated state of the SCG in a case of determining not to perform radio link monitoring on the PSCell in the deactivated state of the SCG, and the processing unit activates the SCG in a case of receiving the SCG activation command and initiates (resumes) radio link monitoring on the PSCell in an activated state of the SCG.

(2) A second embodiment of the present invention is a terminal apparatus that communicates with a base station apparatus, the terminal apparatus including: a processing unit configured to perform communication using an MCG and an SCG; and a receiver configured to receive an SCG deactivation command from the base station apparatus and receive an SCG activation command from the base station apparatus, in which the MCG includes at least a PCell, the SCG includes at least a PSCell, the processing unit deactivates the SCG in a case of receiving the SCG deactivation command, the processing unit determines not to perform beam failure detection on the PSCell in a deactivated state of the SCG in accordance with the fact that the deactivation command includes information indicating that beam failure detection is not performed, the processing unit indicates to the MAC entity of the SCG of the terminal apparatus not to perform beam failure detection on the PSCell in the deactivated state of the SCG in a case of determining not to perform beam failure detection on the PSCell in a deactivated state of the SCG, and the processing unit activates the SCG and indicates to the MAC entity of the SCG of the terminal apparatus to initiate (resume) beam failure detection on the PSCell in an activated state of the SCG in a case of receiving the SCG activation command.

(3) A third embodiment of the present invention is a base station apparatus that communicates with a terminal apparatus, the base station apparatus including: a processing unit configured to communicate with the terminal apparatus; and a transmitter configured to transmit an SCG deactivation command to the terminal apparatus and to transmit an SCG activation command to the terminal apparatus, in which an SCG configured for the terminal apparatus includes at least a PSCell, the transmitter causes the terminal apparatus to deactivate the SCG by transmitting the SCG deactivation command to the terminal apparatus, the base station apparatus causes the terminal apparatus, by including information indicating that radio link monitoring is not performed in the SCG deactivation command, to determine not to perform radio link monitoring on the PSCell in a deactivated state of the SCG, and causes the terminal apparatus not to perform radio link monitoring on the PSCell in the deactivated state of the SCG by causing the terminal apparatus to determine not to perform radio link monitoring on the PSCell in the deactivated state of the SCG, and the base station apparatus causes the terminal apparatus to activate the SCG by transmitting the SCG activation command, and causes the SCG to initiate (resume) radio link monitoring on the PSCell in an activated state of the SCG.

(4) A fourth embodiment of the present invention is a base station apparatus that communicates with a terminal apparatus, the base station apparatus including, a processing unit configured to communicate with the terminal apparatus; and a transmitter configured to transmit an SCG deactivation command to the terminal apparatus and to transmit an SCG activation command to the terminal apparatus, in which an SCG configured for the terminal apparatus includes at least a PSCell, the transmitter causes the terminal apparatus to deactivate the SCG by transmitting the SCG deactivation command to the terminal apparatus, the base station apparatus causes the terminal apparatus, by including information indicating that beam failure detection is not performed in the SCG deactivation command, to determine not to perform beam failure detection on the PSCell in a deactivated state of the SCG, and causes the terminal apparatus not to perform beam failure detection on the PSCell in the deactivated state of the SCG by causing the terminal apparatus to determine not to perform beam failure detection on the PSCell in the deactivated state of the SCG, and the base station apparatus causes the terminal apparatus to activate the SCG by transmitting the SCG activation command, and causes the SCG to initiate (resume) beam failure detection on the PSCell in an activated state of the SCG.

(5) A fifth embodiment of the present invention is a method of a base station apparatus that communicates with a terminal apparatus, the method including the steps of: performing communication with the terminal apparatus; transmitting an SCG deactivation command to the terminal apparatus; transmitting an SCG activation command to the terminal apparatus; an SCG configured for the terminal apparatus includes at least a PSCell, causing the terminal apparatus to deactivate the SCG by transmitting the SCG deactivation command to the terminal apparatus; causing the terminal apparatus, by including information indicating that radio link monitoring is not performed in the SCG deactivation command, to determine not to perform radio link monitoring on the PSCell in a deactivated state of the SCG, causing the terminal apparatus not to perform radio link monitoring on the PSCell in the deactivated state of the SCG by causing the terminal apparatus to determine not to perform radio link monitoring on the PSCell in the deactivated state of the SCG, causing the terminal apparatus to activate the SCG by transmitting the SCG activation command, and causing the SCG to initiate (resume) radio link monitoring on the PSCell in an activated state of the SCG.

(6) A sixth embodiment of the present invention is a method of a base station apparatus that communicates with a terminal apparatus, the method including the steps of: performing communication with the terminal apparatus; transmitting an SCG deactivation command to the terminal apparatus; transmitting an SCG activation command to the terminal apparatus; an SCG configured for the terminal apparatus includes at least a PSCell, causing the terminal apparatus to deactivate the SCG by transmitting the SCG deactivation command to the terminal apparatus; causing the terminal apparatus, by including information indicating that beam failure detection is not performed in the SCG deactivation command, to determine not to perform beam failure detection on the PSCell in a deactivated state of the SCG, causing the terminal apparatus not to perform beam failure detection on the PSCell in the deactivated state of the SCG by causing the terminal apparatus to determine not to perform beam failure detection on the PSCell in the deactivated state of the SCG, causing the terminal apparatus to activate the SCG in a case of transmitting the SCG activation command, and causing the SCG to initiate (resume) beam failure detection on the PSCell in an activated state of the SCG.

(7) A seventh embodiment of the present invention is an integrated circuit implemented in a terminal apparatus that communicates with a base station apparatus, the integrated circuit causing the terminal apparatus to perform a function of performing communication using an MCG and an SCG and a function of receiving an SCG deactivation command from the base station apparatus and receiving an SCG activation command from the base station apparatus, in which the MCG includes at least a PCell, the SCG includes at least a PSCell, the integrated circuit deactivates the SCG in a case that the integrated circuit receives the SCG deactivation command, the integrated circuit determines not to perform radio link monitoring on the PSCell in a deactivated state of the SCG in accordance with the fact that the deactivation command includes information indicating that radio link monitoring is not performed, the integrated circuit does not perform radio link monitoring on the PSCell in the deactivated state of the SCG in a case of determining not to perform radio link monitoring on the PSCell in the deactivated state of the SCG, and the integrated circuit activates the SCG in a case of receiving the SCG activation command and initiates (resumes) radio link monitoring on the PSCell in an activated state of the SCG.

(8) An eighth embodiment of the present invention is an integrated circuit implemented in a terminal apparatus that communicates with a base station apparatus, the integrated circuit causing the terminal apparatus to perform a function of performing communication using an MCG and an SCG and a function of receiving an SCG deactivation command from the base station apparatus and receiving an SCG activation command from the base station apparatus, in which the MCG includes at least a PCell, the SCG includes at least a PSCell, the integrated circuit deactivates the SCG in a case of receiving the SCG deactivation command, the integrated circuit determines not to perform beam failure detection on the PSCell in a deactivated state of the SCG in accordance with the fact that the deactivation command includes information indicating that beam failure detection is not performed, the integrated circuit indicates to the MAC entity of the SCG of the terminal apparatus not to perform beam failure detection on the PSCell in the deactivated state of the SCG in a case of determining not to perform beam failure detection on the PSCell in the deactivated state of the SCG, and the integrated circuit activates the SCG and indicates to the MAC entity of the SCG of the terminal apparatus to initiate (resume) beam failure detection on the PSCell in an activated state of the SCG in a case of receiving the SCG activation command.

A program running on an apparatus according to an aspect of the present invention may serve as a program that controls a Central Processing Unit (CPU) and the like to cause a computer to operate in such a manner as to implement the functions of the above-described embodiments according to the aspect of the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiment may be partially enabled by a computer. In this case, a program for implementing this control function may be implemented by recording the program in a computer-readable recording medium and causing a computer system to read and perform the program recorded in the recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically stores a program for a short period of time, such as a communication line in a case that the program is transmitted via a network such as the Internet or via a communication line such as a telephone line, and a medium that stores the program for a certain period of time, such as a volatile memory inside the computer system that is a server or a client in this case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that an aspect of the present invention is not limited to the above-described embodiments. In the embodiment, an example of the apparatus is described, but an aspect of the present invention is not limited thereto, and can be applied to a stationary or non-movable electronic apparatus installed indoors and outdoors, for example, a terminal apparatus or a communication apparatus such as an AV apparatus, a kitchen apparatus, a cleaning and washing apparatus, an air conditioning apparatus, an office apparatus, a vending machine, or other life apparatuses.

Although the embodiments of the present invention have been described in detail above with reference to the drawings, specific configurations are not limited to the embodiments, and include design changes and the like without departing from the gist of the present invention. For an aspect of the present invention, various modifications are possible within the scope of the claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter

The invention claimed is:

1. A terminal apparatus that communicates with a base station apparatus, the terminal apparatus comprising:
- a processor configured to perform communication using an MCG and an SCG; and
- a receiver, wherein
- the MCG includes at least a PCell,
- the SCG includes at least a PSCell,
- the receiver is configured to receive, from the base station apparatus, an RRC message indicating deactivation of the SCG and including information indicating whether to perform beam failure detection on a PSCell of a deactivated SCG,
- the processor is configured to deactivate the SCG in accordance with the RRC message indicating deactivation of the SCG, the processor is configured to:

determine whether the information indicates performing beam failure detection on the PSCell of the deactivated SCG;

indicate a MAC entity of the SCG of the terminal apparatus to perform beam failure detection on the PSCell in a deactivated state of the SCG, in a case of determining that the information indicates performing beam failure detection on the PSCell of the deactivated SCG; and indicate the MAC entity of the SCG of the terminal apparatus not to perform beam failure detection on the PSCell in the deactivated state of the SCG, in a case of determining that the information indicates not performing beam failure detection on the PSCell of the deactivated SCG, the receiver is configured to receive, from the base station apparatus, an RRC message indicating activation of the SCG, and the processor is configured to:

activate the SCG in accordance with the RRC message indicating activation of the SCG; and indicate the MAC entity of the SCG of the terminal apparatus to resume beam failure detection on the PSCell, in a case that beam failure detection is not being performed.

2. A base station apparatus that communicates with a terminal apparatus, the base station apparatus comprising:

a processor configured to communicate with the terminal apparatus; and a transmitter, wherein an SCG configured for the terminal apparatus includes at least a PSCell, the transmitter is configured to cause the terminal apparatus to deactivate the SCG by transmitting an RRC message indicating deactivation of the SCG and including information indicating whether to perform beam failure detection on a PSCell of a deactivated SCG, the base station apparatus is configured to cause the terminal apparatus to:

determine whether the information indicates that beam failure detection is performed on the PSCell of the deactivated SCG;

indicate a MAC entity of the SCG of the terminal apparatus to perform beam failure detection on the PSCell in a deactivated state of the SCG, in a case that the base station apparatus causes the terminal apparatus to determine that the information indicates that beam failure detection is performed on the PSCell of the deactivated SCG;

indicate the MAC entity of the SCG of the terminal apparatus not to perform beam failure detection on the PSCell in the deactivated state of the SCG in a case that the base station apparatus causes the terminal apparatus to determine that the information indicates that beam failure detection is not performed on the PSCell of the deactivated SCG;

activate the SCG by transmitting an RRC message indicating activation of the SCG; and indicate the MAC entity of the SCG of the terminal apparatus to resume beam failure detection on the PSCell, in a case that beam failure detection is not being performed.

3. A method of a base station apparatus that communicates with a terminal apparatus, the method comprising:

communicating with the terminal apparatus, wherein an SCG configured for the terminal apparatus includes at least a PSCell, and the method further comprises causing the terminal apparatus to:

deactivate the SCG by transmitting an RRC message indicating deactivation of the SCG and including information indicating whether to perform beam failure detection on a PSCell of a deactivated SCG;

determine whether the information indicates that beam failure detection is performed on the PSCell of the deactivated SCG, indicate a MAC entity of the SCG of the terminal apparatus to perform beam failure detection on the PSCell in a deactivated state of the SCG, in a case that the base station apparatus causes the terminal apparatus to determine that the information indicates that beam failure detection is performed on the PSCell of the deactivated SCG, indicate the MAC entity of the SCG of the terminal apparatus not to perform beam failure detection on the PSCell in the deactivated state of the SCG, in a case that the base station apparatus causes the terminal apparatus to determine that the information indicates that beam failure detection is not performed on the PSCell of the deactivated SCG;

activate the SCG by transmitting an RRC message indicating activation of the SCG; and indicate the MAC entity of the SCG of the terminal apparatus to resume beam failure detection on the PSCell, in a case that beam failure detection is not being performed.

* * * * *